(12) United States Patent
Joseph et al.

(10) Patent No.: US 9,073,787 B2
(45) Date of Patent: Jul. 7, 2015

(54) CERAMIC TO CERAMIC JOINT AND ASSOCIATED METHODS

(75) Inventors: Fellows Joseph, Salt Lake City, UT (US); Merrill Wilson, West Jordan, UT (US)

(73) Assignee: CERAMATEC, INC., Salt Lake City, UT (US)

( * ) Notice: Subject to any disclaimer, the term of this patent is extended or adjusted under 35 U.S.C. 154(b) by 30 days.

(21) Appl. No.: 13/112,116

(22) Filed: May 20, 2011

(65) Prior Publication Data

US 2011/0288648 A1  Nov. 24, 2011

Related U.S. Application Data

(60) Provisional application No. 61/347,275, filed on May 21, 2010.

(51) Int. Cl.
*B23B 7/04* (2006.01)
*C04B 37/00* (2006.01)

(52) U.S. Cl.
CPC ......... *C04B 37/006* (2013.01); *C04B 2235/662* (2013.01); *C04B 2235/96* (2013.01); *C04B 2237/121* (2013.01); *C04B 2237/365* (2013.01); *C04B 2237/368* (2013.01); *C04B 2237/52* (2013.01); *C04B 2237/60* (2013.01); *C04B 2237/708* (2013.01); *C04B 2237/72* (2013.01)

(58) Field of Classification Search
None
See application file for complete search history.

(56) References Cited

U.S. PATENT DOCUMENTS

| 4,324,356 | A | * | 4/1982 | Blair et al. ................ 228/193 |
| 4,762,269 | A | * | 8/1988 | Gyarmati et al. ........... 228/194 |
| 4,851,299 | A | | 7/1989 | Godziemba-Maliszewski |
| 4,884,737 | A | * | 12/1989 | Newkirk et al. ............ 228/121 |
| 5,794,838 | A | | 8/1998 | Ushikoshi et al. |
| 6,884,511 | B1 | | 4/2005 | Rossing et al. |
| 2006/0182908 | A1 | * | 8/2006 | Fujii ........................ 428/34.4 |

FOREIGN PATENT DOCUMENTS

| EP | 0292420 | 11/1988 |
| GB | 2047151 | 11/1980 |

(Continued)

OTHER PUBLICATIONS

Ferro et al. "Transient liquid phase joining of reaction bonded silicon carbide". 1993. Ceramic Transactions, vol. 35, pp. 271-279.*

(Continued)

*Primary Examiner* — Humera Sheikh
*Assistant Examiner* — Seth Dumbris
(74) *Attorney, Agent, or Firm* — David Fonda

(57) ABSTRACT

The present invention provides a ceramic to ceramic joint and methods for making such a joint. Generally, the joint includes a first ceramic part and a second ceramic part, wherein the first and second ceramic parts each include a ceramic-carbide or a ceramic-nitride material. In some cases, an aluminum-initiated joint region joins the first and second ceramic parts. This joint region typically includes chemical species from the first and second ceramic parts that have diffused into the joint region. Additionally, the first and second ceramic parts each typically include a joint diffusion zone that is disposed adjacent to the joint region and which includes aluminum species from the joint region that have diffused into the joint diffusion zone. Other implementations are also described.

34 Claims, 15 Drawing Sheets

(56) References Cited

FOREIGN PATENT DOCUMENTS

| JP | 05-148051 | * | 9/1993 | ............ C04B 37/00 |
| JP | 2006-182597 | * | 7/2006 | ............ C04B 37/00 |

OTHER PUBLICATIONS

Iseki et al., "Interfacial reactions between SIC and aluminum during joining", 1984, Journal of Materials Science, vol. 19, pp. 1692-1698.*

Iseki et al., "Joining of Dense Silicon Carbide by Aluminum Metal", 1983, Yogyo Kyokaishi, vol. 91, pp. 1-6.*

Park, Jong C., "International Search Report", Search report for PCT application No. US2011/037296, (Feb. 9, 2012),1-3.

Park, Jong C., "Written Opinion of the International Searching Aurthority", Writtin opinion of search report for PCT application # US2011/037296, (Feb. 9, 2012),1-5.

Kim, Jin Y., et al., "Ag—Al based air braze for high temperature electrochemical devices", *International Journal of Hydrogen Energy*, 32, 2007, (Oct. 12, 2006),3754-3762.

Kim, Jin Y., et al., "Use of aluminum in air-brazing aluminum oxide", *J. Materials Research*, 19 [6], (Jun. 1, 2004),1717-1722.

Kim, Jin Y., "Mechanical properties and dual atmosphere tolerance of Ag—Al based braze", *Intl. J. Hydrogen Energy*, 33, (Mar. 14, 2008),3952-3961.

Park, Jong C., "International Search Report", Search report for PCT application No. US2011/037296, 1-3.

Park, Jong C., "Written Opinion of the International Searching Aurthority", Writtin opinion of search report for PCT application # US2011/037296, 1-5.

"Non-Final Office Action", Chinese Application No. 201180025087. 2, (Oct. 8, 2013),1-10.

"Non-final Office Action", Chinese Application No. 201180025087. 2, (Jun. 13, 2014),1-20.

Ferro, et al., "Liquid Phase Bonding of Siliconized Carbide", *Journal of Materials Science*, No. 30, p. 6119-6135, (Dec. 31, 1995),1-9.

Buffet, Noemie "European Search Report", EP Patent Application No. 11784302.9 (Corresponding to U.S. Appl. No. 13/112,116), (Feb. 11, 2014),1-12.

Katsuaki, et al., "Joining of silicon nitride to silicon nitride and to Invar alloy using an aluminium interlayer", *Journal of Materials Science*, Kluwer Academic Publishers, Dordrecht, vol. 22, No. 4, Apr. 1, 1987, ,1359-1364.

Iseki, T et al., "Interfacial reactions between SiC and aluminum during joining", *Journal of Materials Science*, Kluwer Academic Publishers, Dordrecht, vol. 19, No. 5, 1692-1698, (May 1, 1984),1692-1698.

Hajdu, Judit "Search Report", Singapore Patent Application No. 2012084000 (Corresponding to U.S. Appl No. 13/112,116), (Apr. 30, 2014),1-7.

Hajdu, Judit "Written Opinion", Singapore Patent Application No. 2012084000 (Corresponding to U.S. Appl. No. 13/112,116), (Apr. 30, 2014),1-7.

"Non Final Office Action", Chinese Application No. 201180025087. 2, (Dec. 8, 2014),1-18.

Braun, Gabor "Search and Examination Report", Singapore Patent Application No. 2012084000, (Nov. 12, 2014),1-9.

* cited by examiner

CERAMIC TO CERAMIC JOINT AND ASSOCIATED METHODS

CROSS-REFERENCE TO RELATED APPLICATION

This application claims priority to U.S. Provisional Patent Application Ser. No. 61/347,275, filed May 21, 2010, and entitled "IN-SITU, HIGH-TEMPERATURE, CORROSION-RESISTANT CERAMIC JOINT AND METHOD FOR MAKING THE SAME;" the entire disclosure of which is hereby incorporated by reference.

FIELD OF THE INVENTION

The present invention relates in general to ceramic materials. More particularly, the present invention provides a ceramic to ceramic joint and methods for making the joint, wherein the joint includes a multi-phase, ceramic joint region.

BACKGROUND OF THE INVENTION

Processes for joining one piece of ceramic material to either another piece of ceramic material or to a piece of metal have been found to be useful in many fields of technology. Indeed, the fabrication of many complex, multi-functional systems (such as heat exchangers, gas turbines, engines, and other systems that are used at both low and high temperatures) require that ceramics be joined with other ceramics or metals.

In some instances, a metallic brazing technique is used to join one ceramic to another, or to join one ceramic to a metal. However, some metallic brazes can be susceptible to oxidation in oxidizing environments—especially at high temperatures. Accordingly, where a joint that was formed with a metallic braze is used in an oxidizing environment and at high temperatures, oxidation tends to weaken the joint and shorten its operational lifespan.

While some brazing technologies have been improved so that their resultant brazes and joints have an improved resistance to oxidation at high temperatures, such improvements are not necessarily free from shortcomings. For instance, in many cases, the improved oxidation resistance of some brazing techniques may come with a reduction in joint strength and a reduction in the braze's ability to wet a ceramic substrate.

Thus, while techniques for joining one ceramic to another ceramic (or to a metal) exist, challenges with such techniques may also exist, including those previously mentioned. In this regard, there is a need in the art for a way to join specific types of ceramics with the ease of a metal braze (which results in joints that have excellent strength properties in high temperatures) but without the drawbacks that are associated with a joint that has temperature limitations due to oxidation and its associated weakening and property losses. Thus, it would be an improvement in the art to augment or even replace certain conventional brazing techniques with other joining techniques.

BRIEF SUMMARY OF THE INVENTION

The present invention provides a ceramic to ceramic joint and methods for making such a joint. In some implementations, the joint includes a first ceramic part, wherein the first ceramic part is a ceramic carbide or a ceramic nitride. Additionally, the joint includes a second ceramic part, wherein the second ceramic part is a ceramic carbide or a ceramic nitride. Furthermore, the joint includes an aluminum-initiated joint region that joins the first and second ceramic parts. In this regard, the joint region includes chemical species from the first and second ceramic parts that are diffused within the joint region. In turn, the first ceramic part includes a first joint diffusion zone that is disposed adjacent to the joint region and which includes aluminum species from the joint region that are diffused within the first joint diffusion zone, and the second ceramic part includes a second joint diffusion zone that is disposed adjacent to the joint region and which includes aluminum species from the joint region that are diffused within the second joint diffusion zone.

In other implementations, the joint includes a first and a second ceramic part that each comprise a material selected from a ceramic carbide or a ceramic nitride. Additionally, in such implementations, the joint also includes an aluminum-initiated joint region that joins the first and second ceramic parts and that is characterized by diffusion and counter-diffusion of chemical species between the joint region and the adjoining first and second ceramic parts. While the joint region can have any suitable strength, in some instances, the joint region has a joint strength that is greater than 50% of a bulk strength of the first and second ceramic parts. In other instances, the joint's strength is greater than an amount selected from about 60%, about 70%, about 80%, and about 90% of the bulk strength of the first and second ceramic parts. In still other instances, however, the joint's strength is greater than or equal to the bulk strength of the first and second ceramic parts.

With respect to the methods for forming ceramic to ceramic joints, in some implementations, such methods may include obtaining a first ceramic part and a second ceramic part, positioning a joint initiator (that includes aluminum) within a joint region between and adjacent the first ceramic part and the second ceramic, and heating the joint initiator and the first and second ceramic parts adjacent to the joint initiator to a temperature greater than about 700° C. for a time period sufficient to cause diffusion and counter-diffusion of chemical species between the joint initiator and the adjoining first and second ceramic parts. In other implementations, the joint initiator and adjacent ceramic substrates are heated to a temperature that is greater than a temperature selected from about 800° C., about 900° C., and about 1,000° C.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings are not made to scale, depict only some representative embodiments of the invention, and are not therefore to be considered to be limiting of its scope, the invention will be described and explained with additional specificity and detail through the use of the accompanying drawings in which:

Figure 3:
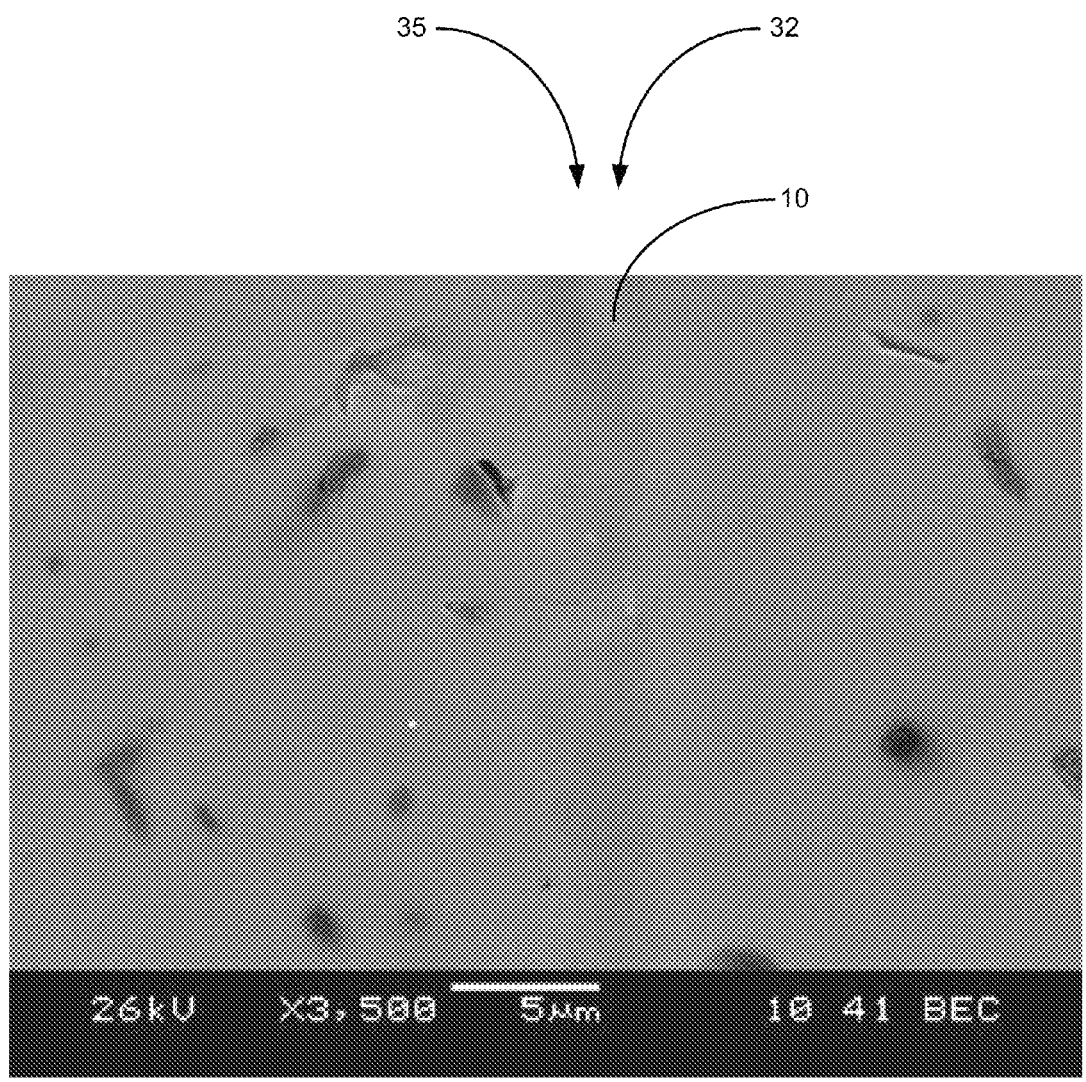
Figure 4:
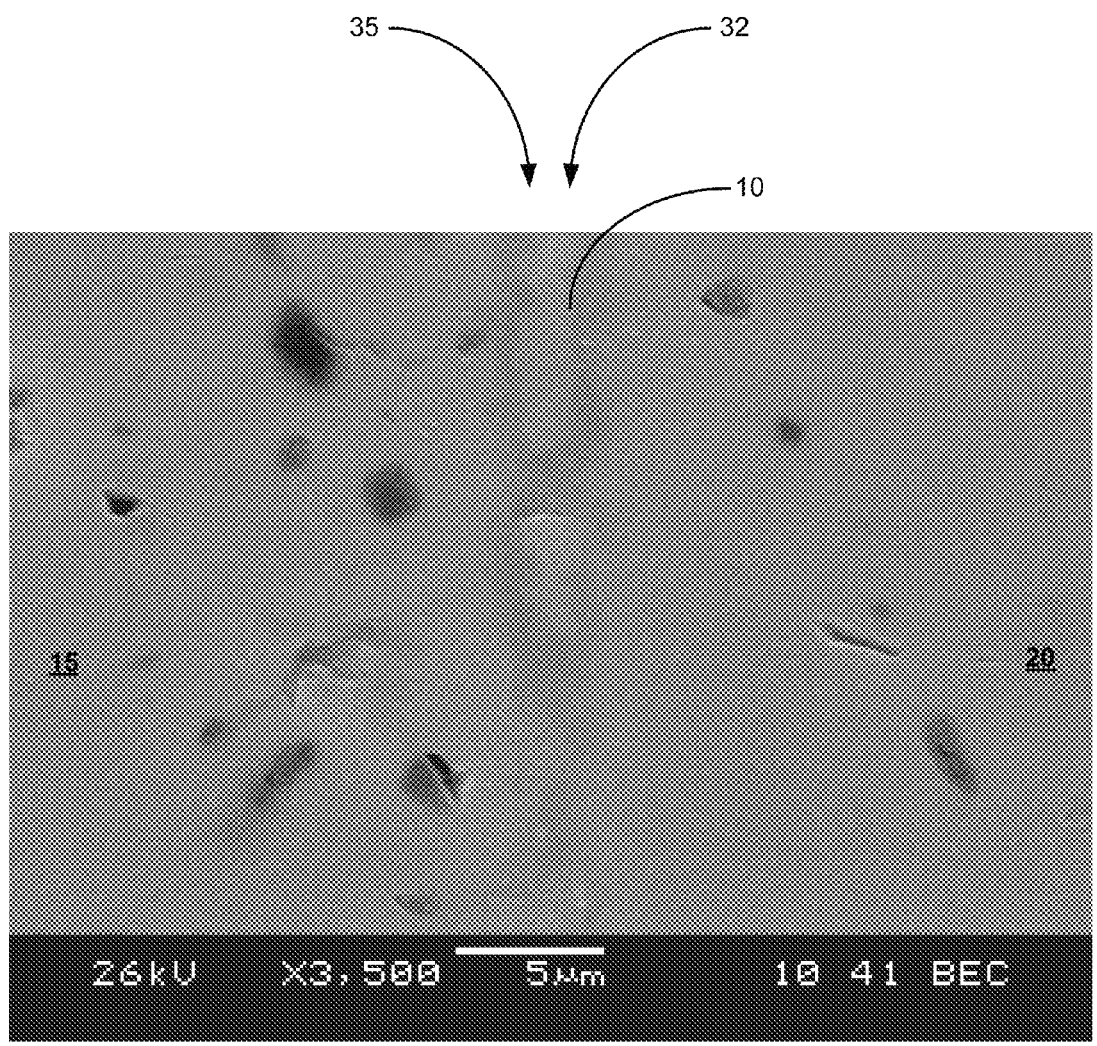
Figure 5:
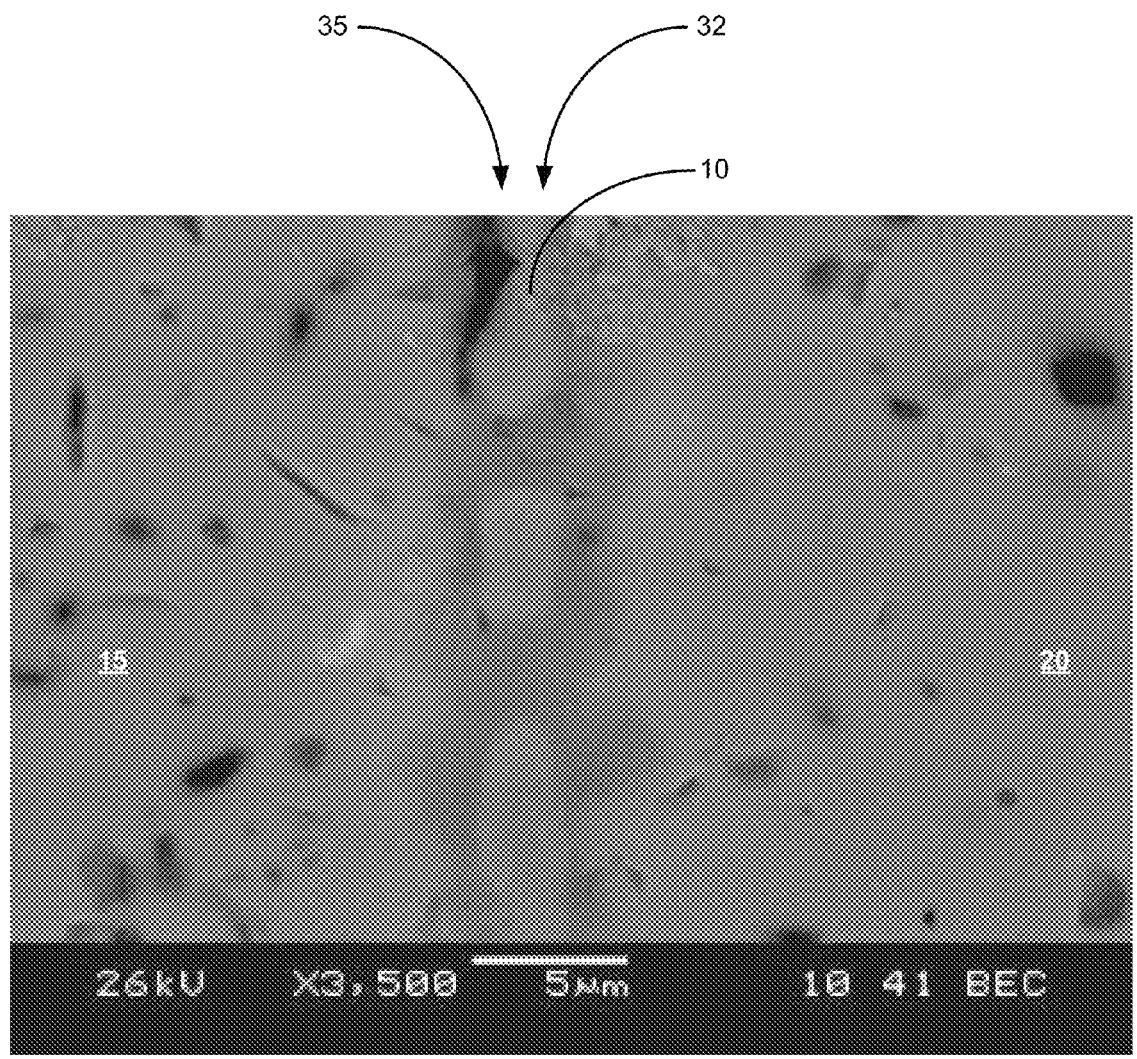
Figure 10:
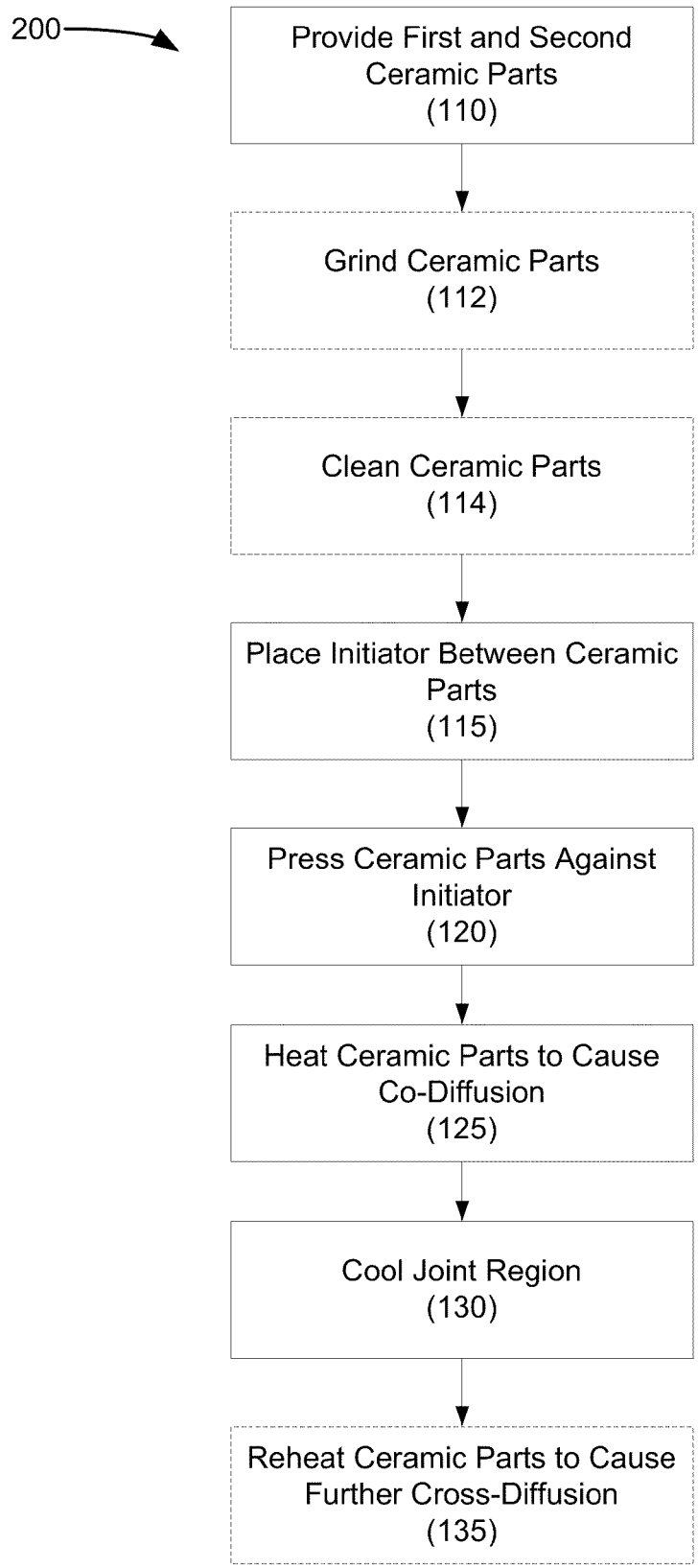
Figure 11:
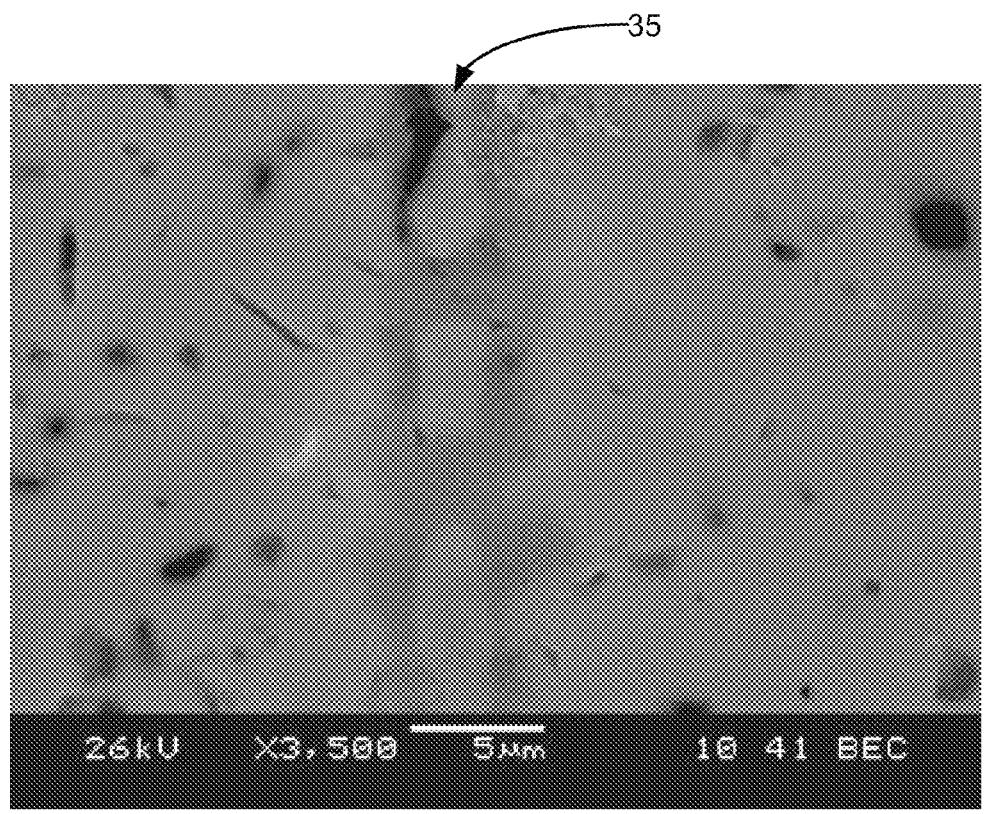
Figure 12:
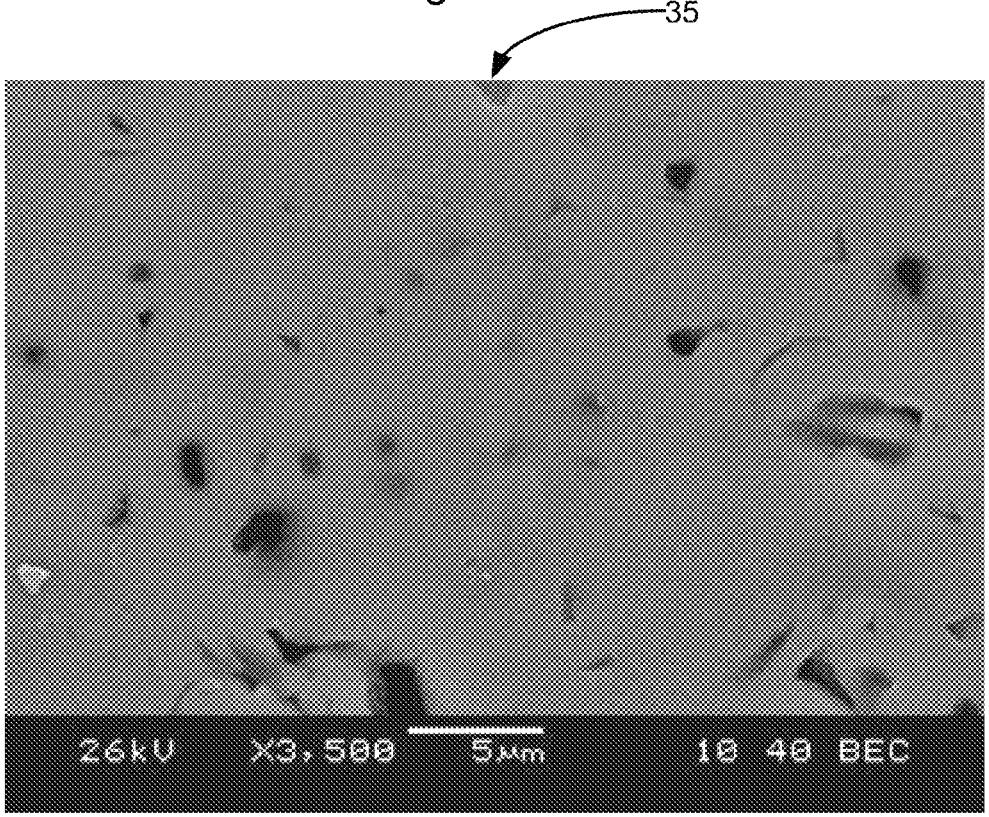
Figure 13:
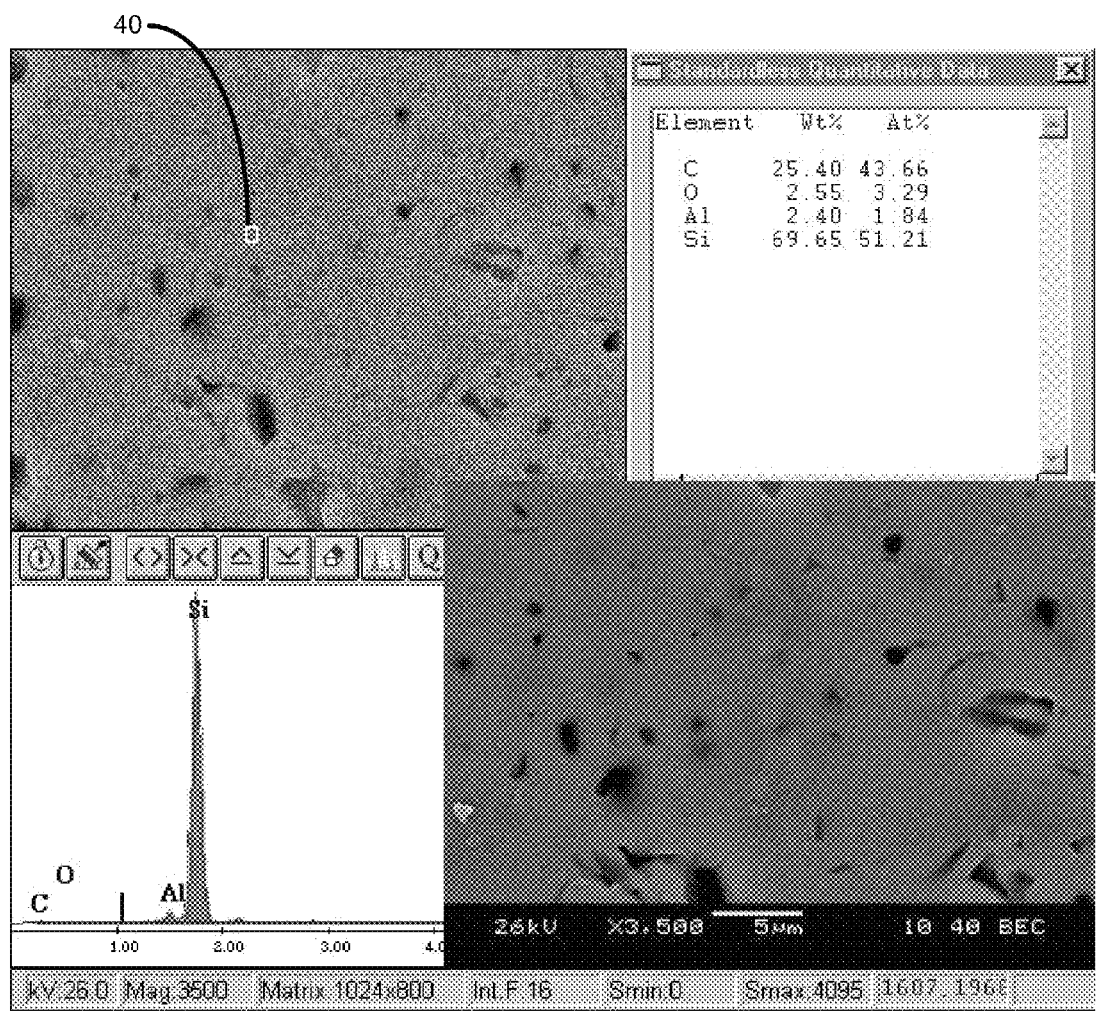
Figure 14:
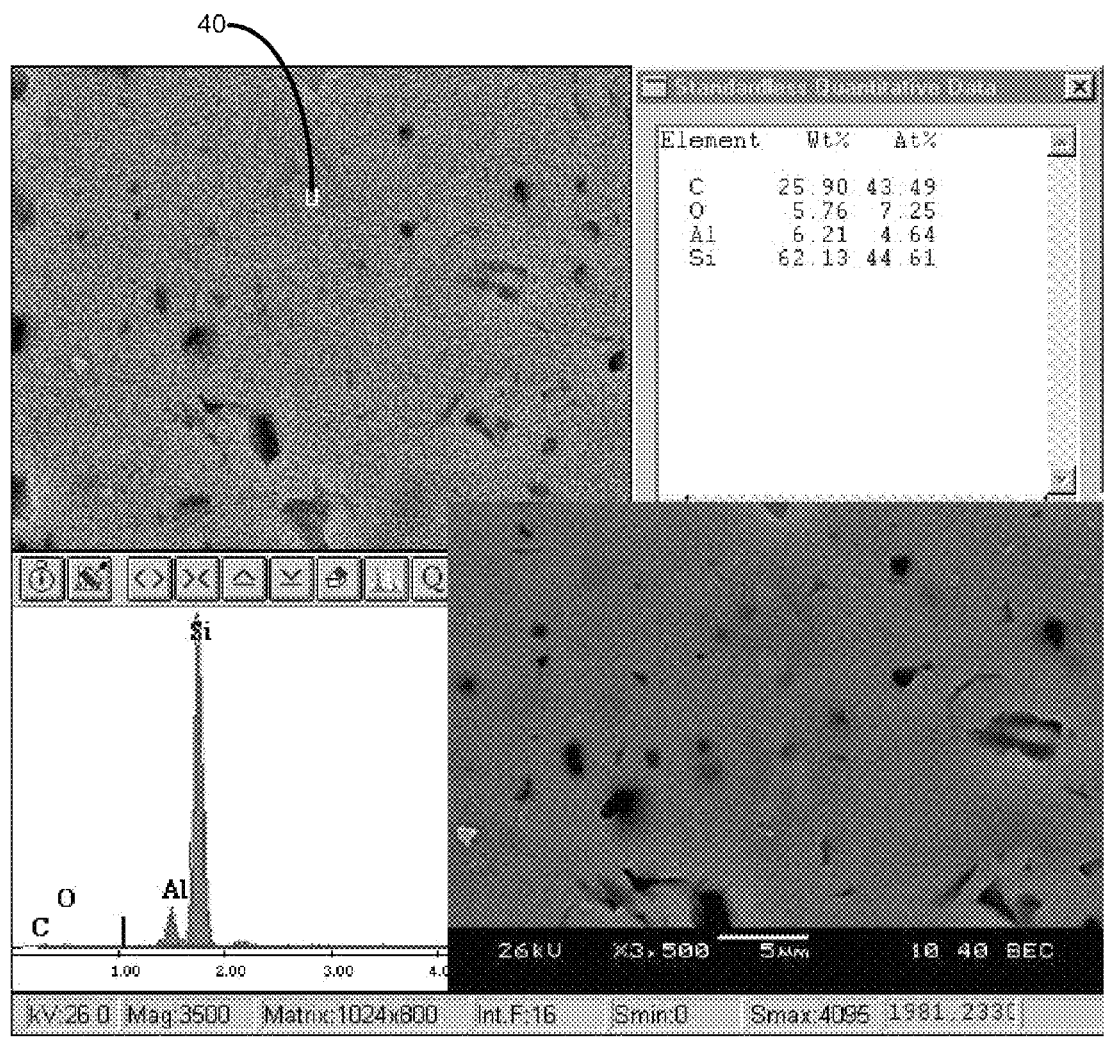
Figure 15:
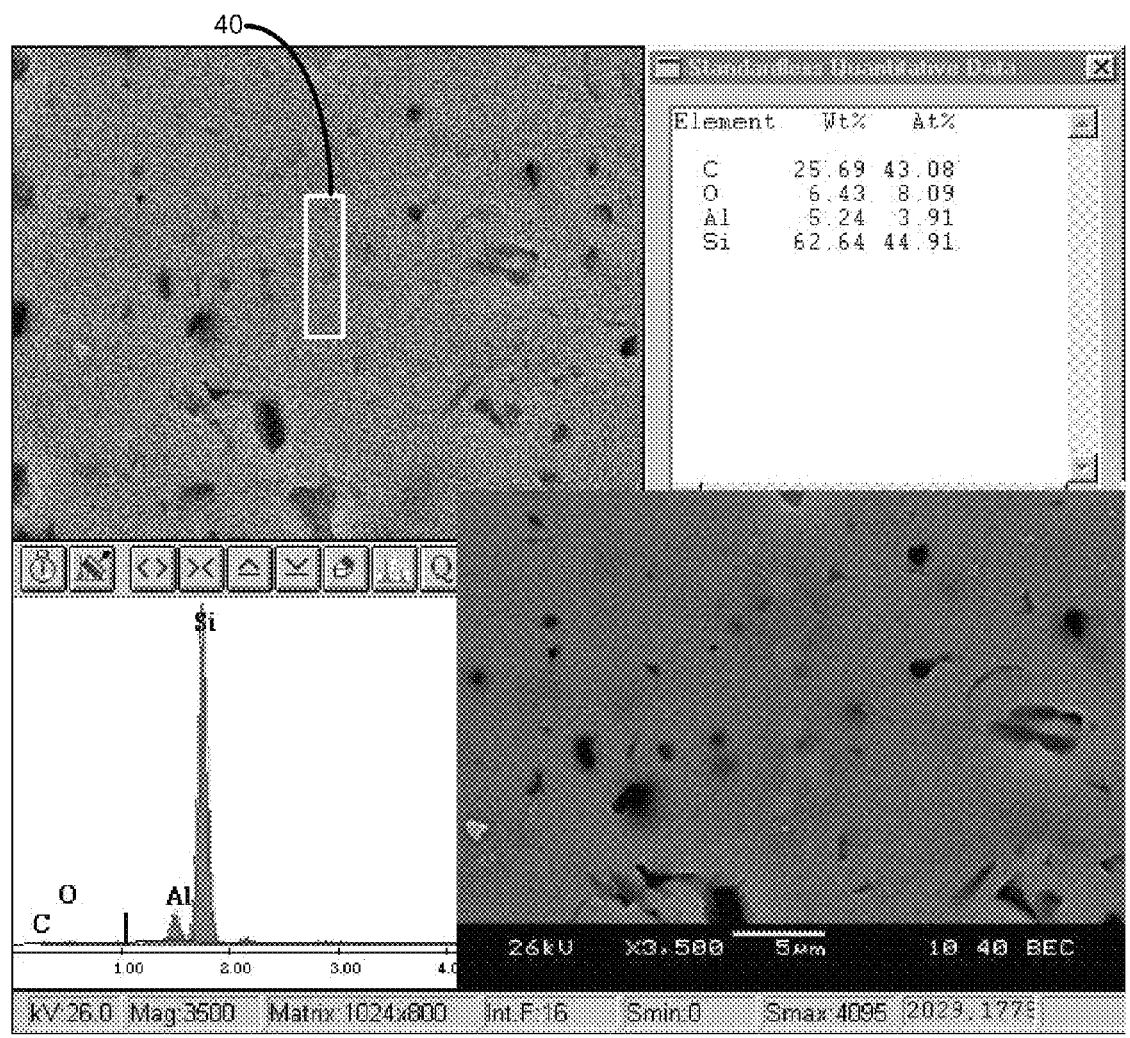
Figure 16:
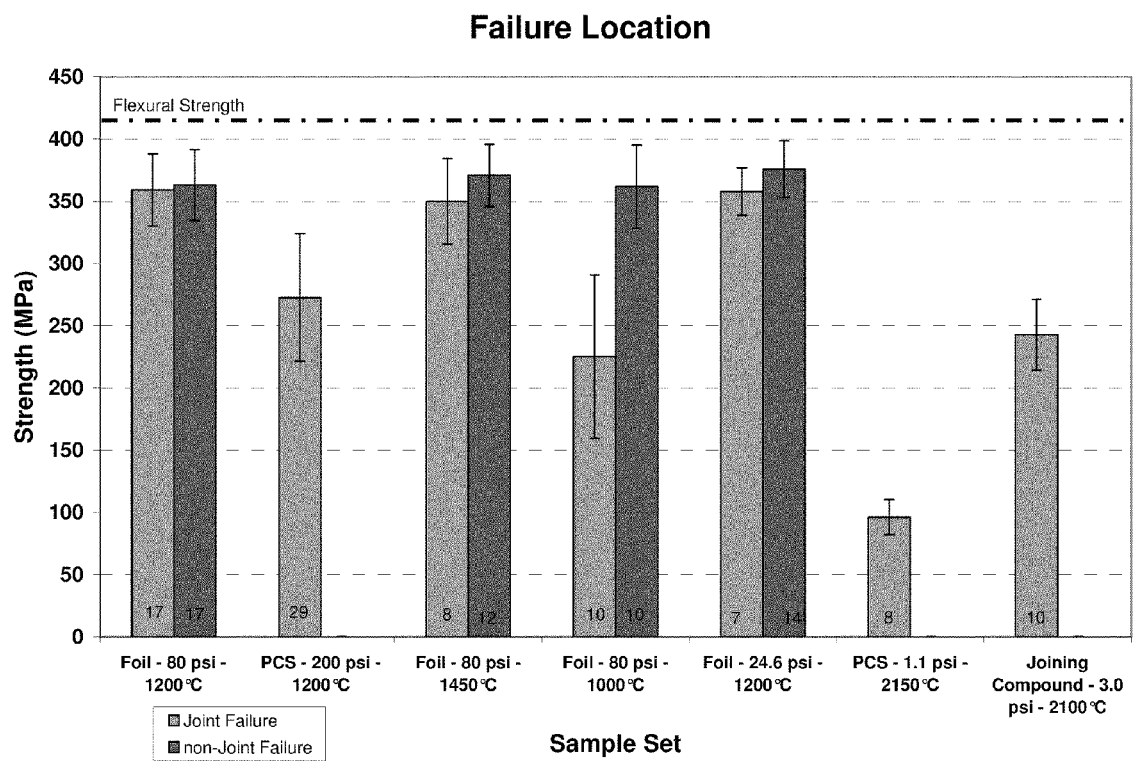

FIGS. 3-5 each depict a cross-sectional view, obtained through scanning electron microscopy, of some embodiments of an aluminum-initiated joint;

FIGS. 6-9 each depict energy dispersive X-ray spectroscopy results, showing cross-diffusion of chemical species within a representative embodiment of a joint region, wherein X-ray spectroscopy results were taken from different places within the aluminum-initiated joint shown in FIG. 4;

FIG. 10 depicts a flow chart of a representative embodiment of a modified method for forming the multi-phase ceramic joint;

FIG. 11 depicts a cross-sectional view, obtained through scanning electron microscopy, of some embodiments of the aluminum-initiated joint, wherein the joint has been prepared with a single heating step;

FIG. 12 depicts a cross-sectional view, obtained through scanning electron microscopy, of some embodiments of the aluminum-initiated joint, wherein the joint has been prepared with multiple heating steps;

FIGS. 13-15 each depict energy dispersive X-ray spectroscopy results, showing cross-diffusion of chemical species within a representative embodiment of the joint region, wherein the X-ray spectroscopy results were taken from different places within the aluminum-initiated joint shown in FIG. 12; and FIG. 16 depicts a graph that shows some experimental results that indicate a resultant failure location for several types of ceramic to ceramic joints.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Additionally, while the following description refers to several embodiments and examples of the various components and aspects of the described invention, all of the described embodiments and examples are to be considered, in all respects, as illustrative only and not as being limiting in any manner.

Furthermore, the described features, structures, or characteristics of the invention may be combined in any suitable manner in one or more embodiments. In the following description, numerous specific details are provided, such as examples of suitable ceramics, joint initiators, heating methods, cleaning methods, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Many traditional brazing techniques that are used to form joints between ceramics function by wetting the ceramic substrates with chemical species from a brazing material and without any substantial bulk interaction and modification of the ceramic substrates themselves. In other words, in many conventional brazing techniques, while the chemistry and phases of the brazing material itself may change during joint formation, the brazing material remains substantially independent of, and bonds to, the ceramic bulk. As a result, the joints created from some traditional brazing techniques essentially rely on the wetting (and solidification) of the brazing material and chemical species thereof to the corresponding ceramic substrates.

In contrast, some embodiments of the present invention provide ceramic to ceramic joints (and methods for creating such joints) that involve the in-situ formation of a multi-phase ceramic. In this regard, the described joints can be formed through the diffusion of chemical species from a joint initiator (e.g., aluminum foil) into two or more adjacent ceramic substrates and through the counter-diffusion of chemical species from the ceramic substrates into the joint initiator (or into the region in which it initially resided). As this diffusion and counter-diffusion occur, a variety of ceramics can be formed in a joint region between the bulk of the ceramic substrates that are being joined. Accordingly, the described ceramic to ceramic joint may be referred to herein as a multi-phase ceramic joint.

Figure 1:
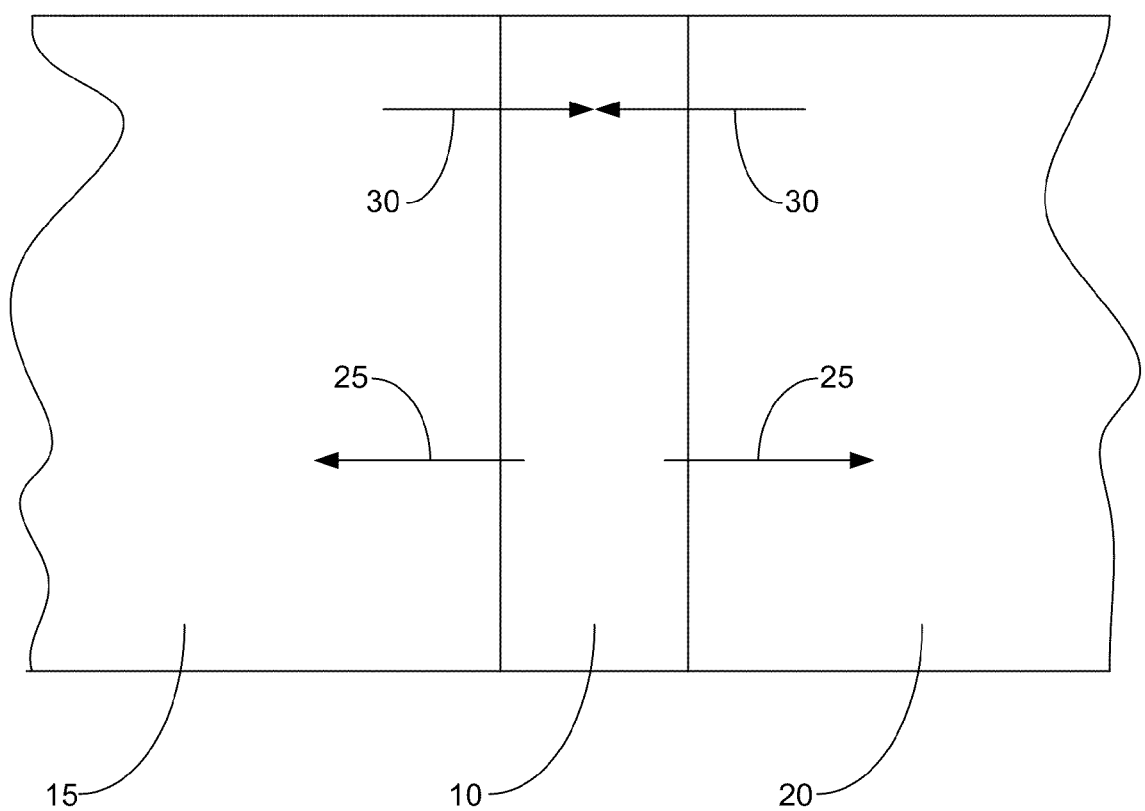
FIG. 1 depicts a schematic diagram showing some embodiments of a joint initiator between a first and a second substrate, before the multi-phase ceramic joint is formed.

By way of illustration, FIG. 1 shows some embodiments in which a joint initiator 10 (e.g., a layer of aluminum) is placed between a first 15 and a second 20 ceramic part (or substrate). While FIG. 1 shows the joint initiator 10 and the substrates (15 and 20) before joint formation, that figure illustrates that when the various components are heated and processed (as described below), chemical species from the initiator 10 can diffuse (as indicated by arrows 25) into joint diffusion zones (or regions adjacent to the initiator) in the substrates. Additionally, FIG. 1 shows that when the various components are heated and processed, chemical species from the ceramic substrates (15 and 20) counter-diffuse (as indicated by arrows 30) into the joint initiator 10. Due to this "cross-diffusion," the joint initiator can greatly reduce in size and substantially change from a metal to a ceramic as the joint is formed. Accordingly, while the wetting of the ceramic substrates with chemical species from the joint initiator may be important in the initial stages of joint formation, that wetting can be replaced with a solid-state diffusion mechanism in the later stages of joint formation and, thereby, create an extremely strong joint region. Furthermore, depending upon processing conditions, one may form a joint region having a range of ceramic characteristics.

Thus, unlike some conventional brazing techniques that are used to form ceramic to ceramic joints and that retain a definite and distinct metal phase (e.g., the brazing material) between the joined ceramics, some embodiments of the described joint form a multi-phase ceramic joint region that joins the bulk of the two ceramic substrates together.

Figure 2:
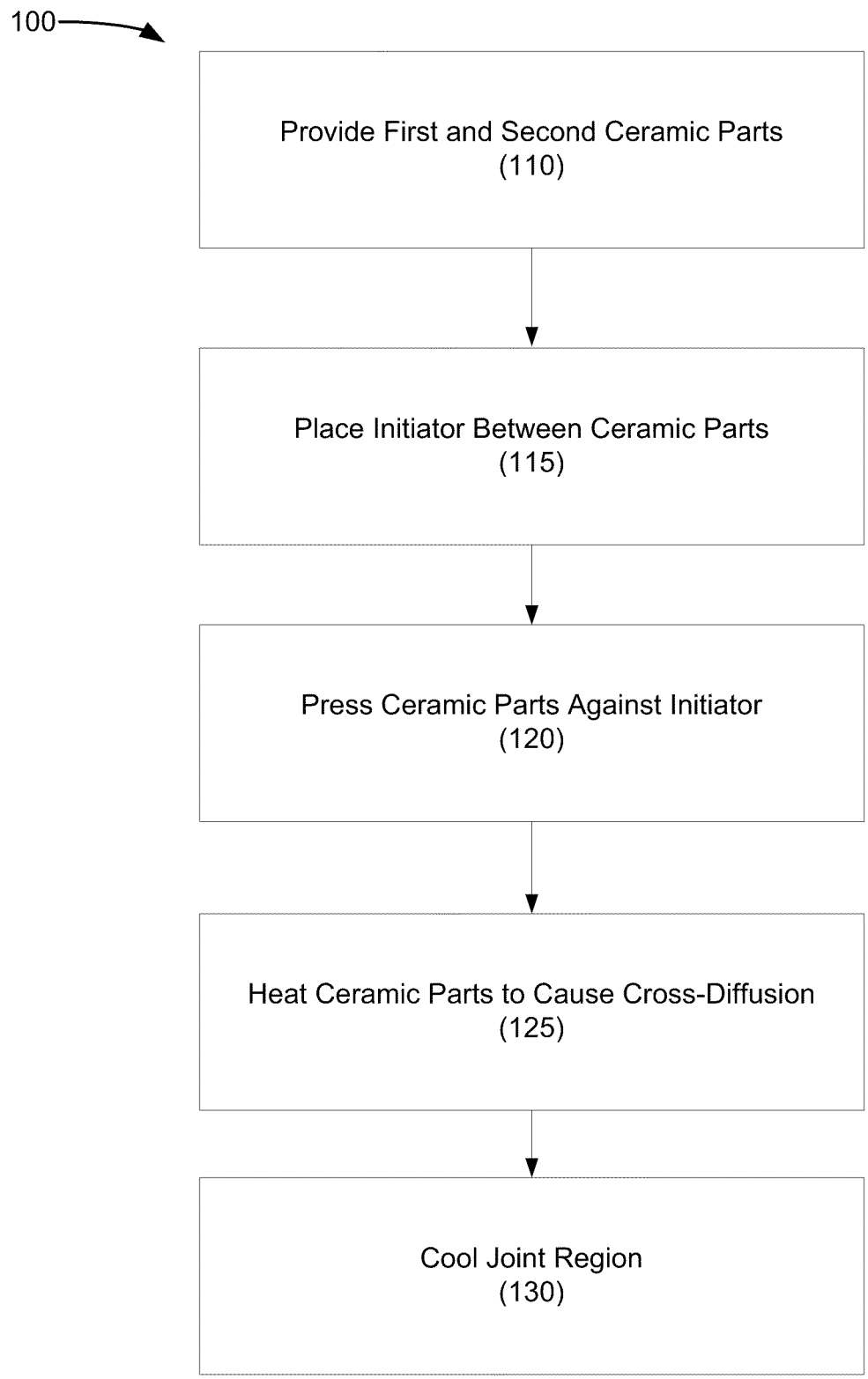
FIG. 2 depicts a flow chart of a representative embodiment of a method for forming a multi-phase ceramic joint.

The described multi-phase, ceramic joint region (joint region or joint) can be formed in any suitable manner. In this regard, FIG. 2 illustrates some embodiments of a method 100 for forming the described multi-phase joint. More specifically, FIG. 2 shows some embodiments of a method 100 for forming the described joint, wherein the processing parameters of the method that are used to control the transformation of the joint initiator may include pressure, temperature, and time. A more detailed description of the method is provided below.

In particular, FIG. 2 shows that, in some embodiments, the method 100 begins at step 110 by providing one or more ceramic substrates that are to be joined together. In this regard, the described method can be used to create a single joint region that joins any suitable number of substrates together. By way of non-limiting example, the described method can be used to join 2, 3, 4, 5, or more ceramic substrates together at a single joint. For the sake of simplicity, however, this application focuses on joining two substrates together.

The described method 100 can be used to join any suitable type of ceramic substrates together. Some non-limiting examples of suitable substrates include materials comprising one or more ceramic carbides (e.g., silicon carbide, aluminum carbide, etc.), ceramic nitrides (e.g., silicon nitride, etc.), Sialon ceramics, and combinations thereof. Indeed, in some embodiments, the described method is used to join one ceramic carbide (e.g., silicon carbide) substrate to another ceramic carbide (e.g., silicon carbide) substrate. In other embodiments, the described method is used to join one ceramic nitride (e.g., silicon nitride) substrate to another ceramic nitride (e.g., silicon nitride) substrate. In still other embodiments, the described method is used to join a ceramic carbide (e.g., silicon carbide) substrate with a ceramic nitride (e.g., silicon nitride) substrate.

At step 115, FIG. 2 shows the method 100 can proceed as a joint initiator 10 is applied between the first 15 and second 20 ceramic substrates. In this regard, the joint initiator can comprise any suitable metal that allows its chemical species to diffuse into the adjacent joint diffusion zones of the ceramic substrates, while the chemical species from the ceramic substrates counter-diffuse into the joint initiator (or the location in which the initiator initially resided). One non-limiting example of a suitable joint initiator comprises aluminum. For simplicity, a multi-phase joint formed through the use of an aluminum joint initiator may be referred to herein as an aluminum-initiated joint.

Where the joint initiator 10 comprises aluminum, the initiator can comprise any suitable form of aluminum. By way of non-limiting example, the joint initiator can comprise an undoped aluminum (e.g., a pure or substantially pure sample of aluminum). Indeed, in certain embodiments, the joint initiator comprises a substantially pure sample of aluminum. In other embodiments, the joint initiator may include doped aluminum or an aluminum alloy.

The joint initiator 10 can initially be in any suitable form or state that allows the described joint to be formed between at least two ceramic substrates (e.g., the first 15 and second 20 substrates). By way of non-limiting example, the joint initiator (e.g., undoped aluminum) can initially be in the form of a foil, powder, ink, gel, suspended solid, solution, or any suitable combination thereof. In some embodiments, however, the joint initiator is applied as a foil.

The joint initiator 10 (e.g., a sample of aluminum) can be applied to the joint region between the ceramic substrates (e.g., the first 15 and second 20 substrates) in any suitable manner that allows one or more of its chemical species to cross-diffuse with one or more of the chemical species from the substrates in order to form the described joint. In one non-limiting example, the joint initiator is provided as one or more standalone elements (e.g., one or more pieces of foil) that are placed between the two ceramic substrates. In another non-limiting example, however, the joint initiator is applied to one or both of the ceramic substrates to be joined. In this example, the initiator can be applied to one or both of the substrates in any suitable manner, including, without limitation, by being sprayed, deposited, sputtering, vapor deposited, dip coated, screen printed, or otherwise being applied to the substrates. Furthermore, the initiator can be applied to one or both of the substrates in coats or layers. In this regard, any suitable number of coats or layers of the initiator can be applied between the substrates, including, but not limited to, 1, 2, 3, 4, 5, or more.

Before the joint initiator 10 (e.g., aluminum foil) and the ceramic substrates (e.g., substrates 10 and 15) are heated to allow cross-diffusion between the initiator and the substrates (as described below), the joint initiator can be any suitable thickness that allows the described cross-diffusion in order to form the described joint. Specifically, it may be beneficial (in some embodiments) to have the joint initiator initially be thick enough to allow it to wet and diffuse into the adjacent ceramic substrates (e.g., substrates 15 and 20), without being so thick that it hinders proper diffusion or causes excessive pooling of the initiator at a surface of the joint. In this regard, it has been found that if the initiator is too wide, a portion of it may pool on the outside of the joint region. Furthermore, it has been found that (due to the kinetics of diffusion associated with joint processing parameters, such as heating temperature, heating time, load, etc.) if the initiator is too thick, then chemical species of the ceramic substrates (e.g., chemical species of silicon carbide) will not be able to diffuse into some portions of the initiator because the diffusion distance is too great. Accordingly, portions of an initiator that are overly thick before processing may remain intact (e.g., portions of an aluminum joint initiator may remain as free aluminum and/or aluminum oxide) after the method 100 is complete. Thus, in some embodiments, joint strength and lifespan may be improved and a cleaner exterior joint may be achieved by selecting a proper joint initiator thickness.

In some embodiments, the joint initiator 10 has an initial thickness that is wider than a width selected from about 1 μm, about 5 μm, about 25 μm, about 100, and about 200 μm. In contrast, in some embodiments, the joint initiator has an initial thickness that is narrower than a width selected from about 30 μm, about 125 μm, about 250 μm, and about 1270 μm. In still other embodiments, the joint initiator can initially have any suitable combination or range of the aforementioned widths that allows it to function as intended (e.g., a width between about 25 μm and about 254 μm thick, a width of about 127 μm thick±3 μm, or a width of about 25 μm thick±5 μm).

Returning to FIG. 2, step 120 shows that in some embodiments, the method 100 for creating the described joint involves the application of a load, or force, to hold the two substrates (e.g., the substrates 15 and 20) in contact with the joint initiator 10 as the initial heating step 125 (described below) is carried out. In this manner, as the initiator is melted, it can be held in contact with, and can be able to wet, the substrates. Furthermore, it will be appreciated that smaller loads may result in joints that are thicker and, thus, such joints may require longer processing times to get the desired cross-diffusion of chemical species to form the in-situ ceramic joint.

Any suitable load can be applied to the first 15 and/or second 20 substrates that will allow the substrates to be kept in contact with joint initiator 10 as the heating step 125 is carried out. Indeed, in one embodiment, the load can be any load greater than about 0 Pa, including being the weight of one substrate on top of the other. In other embodiments, the load to be applied may be greater than a load selected from about 34 kPa, about 70 kPa, about 165 kPa, and about 172 kPa. In some embodiments, the load to be applied may be less than a load selected from about 6.4 MPa, about 861 kPa, about 689 kPa, about 551 kPa, and about 524 kPa. In still other embodiments, the load to be applied can comprise any suitable range or combination of the aforementioned loads (e.g., between about 172 kPa and about 861 kPa, between about 34 kPa and about 6.9 MPa, between about 165 kPa and about 689 kPa, or between about 70 kPa and about 551 kPa).

At step 125, FIG. 2 shows the method 100 can continued as heat is applied to the joint initiator 10 (e.g., aluminum foil) and to the adjacent regions of the ceramic substrates (e.g., substrates 15 and 20). In this regard, the heat can be applied at any suitable time, including, without limitation, after or simultaneously with the application of a load. Accordingly, as described above, as the joint initiator starts to melt, it is able to wet the adjacent ceramic substrates while being kept in full contact with the substrates.

In order to form the described joint, the joint initiator 10 and adjacent portions of the ceramic substrates (e.g., the substrates 15 and 20) can be heated to any suitable temperature that allows chemical species from the initiator to diffuse into the adjacent regions or joint diffusion zones of the ceramic substrates, while chemical species from the ceramic substrates counter-diffuse to the initiator (or to the regions in which the initiator initially resided). In some embodiments, the initiator and adjacent ceramic substrates are heated to temperatures that are higher than the melting point of aluminum (e.g., about 660° C.). In this manner, the joint initiator can melt to provide a transient liquid phase that can wet the adjacent substrates and that can then allow chemical species from the initiator to diffuse into adjacent regions of the substrates.

In other embodiments, the joint initiator 10 and its adjoining substrates (e.g., substrates 15 and 20) are raised to temperatures that are higher than a temperature selected from about 660° C., about 700° C., about 800° C., about 900° C., and about 1,000° C. In some embodiments, the processing of this joint is done by heating the initiator and adjacent substrates to temperatures that are lower than a temperature selected from about 1,800° C., about 1,600° C., about 1,500° C., about 1,200° C., and about 1,050° C. In still other embodiments, the method 100 can involve heating the initiator and adjacent substrates to any suitable combination or range of the aforementioned temperatures that allows the joint to form as described (e.g., a temperature between 660° C. and 1,600° C., between 800° C. and 1,000° C., between about 900° C. and about 1,100° C., or between 875° C. and 1,450° C.).

The joint initiator 10 and adjacent substrates 15 and 20 can be heated at any suitable rate that allows the described joint to be formed. In this regard, the ramp up rate for the temperature can be dictated, to some extent, by the durability of the ceramic substrates. That said, in some non-limiting embodiments, the heating rate for the formation of the described joint is between about 60° C. per hour and about 100° C. per hour. In other embodiments, the heating rate is about 300° C. per hour±50° C. In still other embodiments, the heating rate is between about 50° C. and 100° C. per second. In yet other non-limiting embodiments, the joint initiator and adjoining regions of the substrates are heated about 800° C. over a period of about 10 seconds.

To form the described joint, the joint initiator 10 and adjacent substrates 15 and 20 can be heated through any suitable means that is capable of heating the components sufficiently to allow for cross-diffusion between the initiator and the substrates. In some embodiments, the heating step is done electrically, wherein the ceramic substrate and the joint initiator (and/or joint region containing the chemical species of the initiator) are resistively heated. In other embodiments, the heating step 125 may be performed by applying heat from a torch directly to the region to be joined. In still other embodiments, the heating step may be done in a furnace, kiln, or other thermally-insulated heater. In yet other embodiments, the heating step is completed through heating by inductance or another suitable method for heating ceramics.

Once the desired temperature is achieved, the heat can be applied to the initiator 10, adjacent substrate 15 and 20, and resultant joint region (e.g., aluminum-initiated joint region) for any suitable amount of time that allows a sufficient amount of cross-diffusion to occur in order to create the described joint. In this regard and to some degree, the extent to which the joint initiator and adjacent substrate regions are exposed to high temperatures may determine the level of cross-diffusion of the chemical species of the initiator (e.g., aluminum, etc.) and the chemical species of the ceramic substrate (e.g., silicon, carbon, oxygen, etc.). Additionally, to some extent, the quality and strength of the joint vary depending on the amount of diffusion that has occurred.

In some embodiments, the initiator 10 and adjoining ceramic regions 15 and 20 may be heated for any suitable amount of time between about 1 second and about 1,000 hours or even longer times, or between about 1 hour and about 500 hours. In this regard, if the initiator and adjacent substrates are heated quickly (e.g., with a torch) and the heat is taken off almost instantaneously, the duration of the heating step is minimal. Accordingly, while there may be some cross-diffusion at an interface between the initiator and each of the ceramic substrates, there may still be a substantial amount of the initiator (e.g., free aluminum) remaining in the original region of the joint initiator. Accordingly, additional processing (e.g., heating) may be required to more thoroughly diffuse the chemical species of the initiator into the adjacent ceramic substrates and to allow the ceramic chemical species to counter-diffuse into the initiator region.

On the other hand, if the joining is done at about 1,500° C. and that temperature is held substantially constant for an extended period of time, the initiator 10 (e.g., aluminum) can diffuse out of the initial initiator region with simultaneous counter-diffusion of ceramic chemical species. In this manner, the resultant joint region is pushed towards homogenization, with the joint region having a chemical makeup that is somewhat similar to the bulk ceramic, with very little initiator (e.g., free aluminum) left in the region in which the initiator was initially disposed. Indeed, in some embodiments in which an aluminum initiator is heated to about 1,200° C. for about 1,000 hours, the free aluminum can nearly all diffuse away from the interface and the joint, and the starting aluminum can almost completely disappear.

As a result of the cross-diffusion that occurs because of the heating step 125, the joint region may be defined, to some extent, as a region comprising at least a portion of the original ceramic pieces to be joined and the leftovers from the original initiator (e.g., aluminum). In this regard, the joint can comprise portions of the ceramic substrates that are being joined and very little, if any, of the original joint initiator 10 (e.g., aluminum) that was used to do the joining. Indeed, in some embodiments, after the heating step, there is substantially no initiator (e.g., free aluminum) left in the region in which the initiator originally resided. In other embodiments, there is less than 10 mole % of the original initiator (e.g., free aluminum) left in the joint after processing according to the present invention. In still other embodiments, there is less than 20 mole % of the original initiator in the joint after the completion of the described method 100. In still other embodiments, there is less than 30 mole % of the original initiator in the joint after the method's completion. In yet other embodiments, there is less than 40 mole % of the original initiator left in the joint at the method's completion. Furthermore, in some embodiments, following the cross-diffusion of the chemical species between the joint initiator and the adjoining first and second ceramic substrates, there is less than 60 mole % of the initial initiator (e.g., free aluminum) remaining within the joint region.

To provide a better understanding of the cross-diffusion that can occur within the joint region as a result of the heating step 125, a more detailed discussion of the effects of the heating step is provided herein. In particular, after the joint initiator 10 reaches a suitable temperature (e.g., its melting point), the initiator can enter a liquid phase. In turn, this liquid phase can enable the beginning of the cross-diffusive process between chemical species of the ceramic substrates and the initiator (e.g., aluminum foil) to form new phases. In particular, this liquid phase allows chemical species (e.g., aluminum) from the initiator to wet the substrates and to diffuse into the joint diffusion zones that are adjacent to the initiator region. Furthermore, during this heating step, chemical species from the ceramic substrates (e.g., carbon, and silicon from a silicon carbide substrate; and nitrogen, and silicon from a silicon nitride substrate, etc.) are able to diffuse into the initiator region. In some embodiments, when the heating processes is performed in ambient air, a portion of the joint initiator (e.g., aluminum) may oxidize in situ (e.g., to form aluminum oxide). Thus, where the joining process involves joining a substrate of silicon carbide to another substrate of silicon carbide through the use of an aluminum joint initiator, the aluminum may change into one or more of alumina, an aluminum carbide, an aluminum silicon carbide, aluminum silicate, an aluminum oxy carbide, an aluminum silicon oxy carbide, and/or combinations thereof. Similarly, where the joining process involves joining a ceramic nitride substrate to another ceramic nitride substrate through the use of an aluminum joint initiator, it is believed that the aluminum may change into one or more of alumina, an aluminum silicon nitride, an aluminum nitride, an aluminum silicate, and/or combinations thereof. Accordingly, the heating process may form a multi-phase ceramic in the joint region.

In some embodiments, when the joint initiator 10 and adjacent substrates 15 and 20 are heated to and maintained at a sufficient temperature so that a transient liquid phase is produced, cross-diffusion and compositional changes of the chemical species of the initiator and the substrates is allowed to occur. Moreover, as this heating process continues, the substrates are able to be joined in a substantially iso-thermal, re-solidification process. In other words, as the joint region is held at a suitable temperature, the initiator and adjoining diffusion zones of the substrates tend to homogenize through the described cross-diffusion process. During this process, the liquid phase, formed on the substrate (e.g., silicon carbide) interface, can be very reactive, meaning that the chemical species (e.g., carbon and silicon) of the substrate and initiator (e.g., aluminum) can cross-diffuse very well.

During or after the described iso-thermal re-solidification process and with further homogenization, it is believed that aluminum carbide and aluminum silicon carbide (in the case of silicon carbide substrates), or aluminum nitride and aluminum silicon nitride (in the case of silicon nitride substrates) and their respective oxy carbide or nitride counterparts, are formed. In this regard, it is possible that oxides may enhance the reaction. For example, silica on a silicon carbide substrate (e.g., substrate 15 and/or 20) or alumina on an aluminum joint initiator 10 may allow better cross-diffusion and help form new materials. This is in contrast to some traditional brazing techniques which strive to maintain the character of their brazing material in the joint with oxides (e.g., alumina) only being formed at the interface between the substrates being joined.

In order to illustrate the cross-diffusion that can occur as a result of the heating step 125, FIGS. 3-5 each show a cross-sectional micrograph (obtained through Scanning Electron Microscopy (SEM)) of an embodiment of an aluminum-initiated joint 32 that was processed using one of several conditions required for the joint. In particular, FIGS. 3-5 each show a SEM micrograph of a joint region that was formed between two silicon carbide substrates, using aluminum foil as the joint initiator 10. More specifically, while the joint regions 35 shown in FIGS. 3 and 4 were formed at about 1,000° C. and under a load of about 524 kPa, the joint region 35 shown in FIG. 5 was formed at about 1,450° C. and under a load of about 524 kPa.

While the initial thickness of the initiators 10 (e.g., aluminum foil) used to create the joint regions 35 in FIGS. 3-5 were each about 25 μm prior to the joining process, FIGS. 3-5 show the initiator 10 is essentially unrecognizable because it has been transformed through cross-diffusion into a joint region 35 having an average thickness of between about 3 μm and about 5 μm. In this regard, the interface between the silicon carbide substrates 15 and 20 and the resultant joint region 35 is such that the delineation between where the substrates end and the joint begins is not always clear due to cross-diffusion of chemical species. Additionally, there was little evidence of liquid phase aluminum pooling on the outside of the joint regions shown in FIGS. 3-5, despite the fact that the initial joint initiator was compressed from 25 μm down to as small as about 3 μm after the joining process. This is another sign indicating that cross-diffusion of the chemical species between the initiator and the adjoining substrates has occurred.

Figure 6:
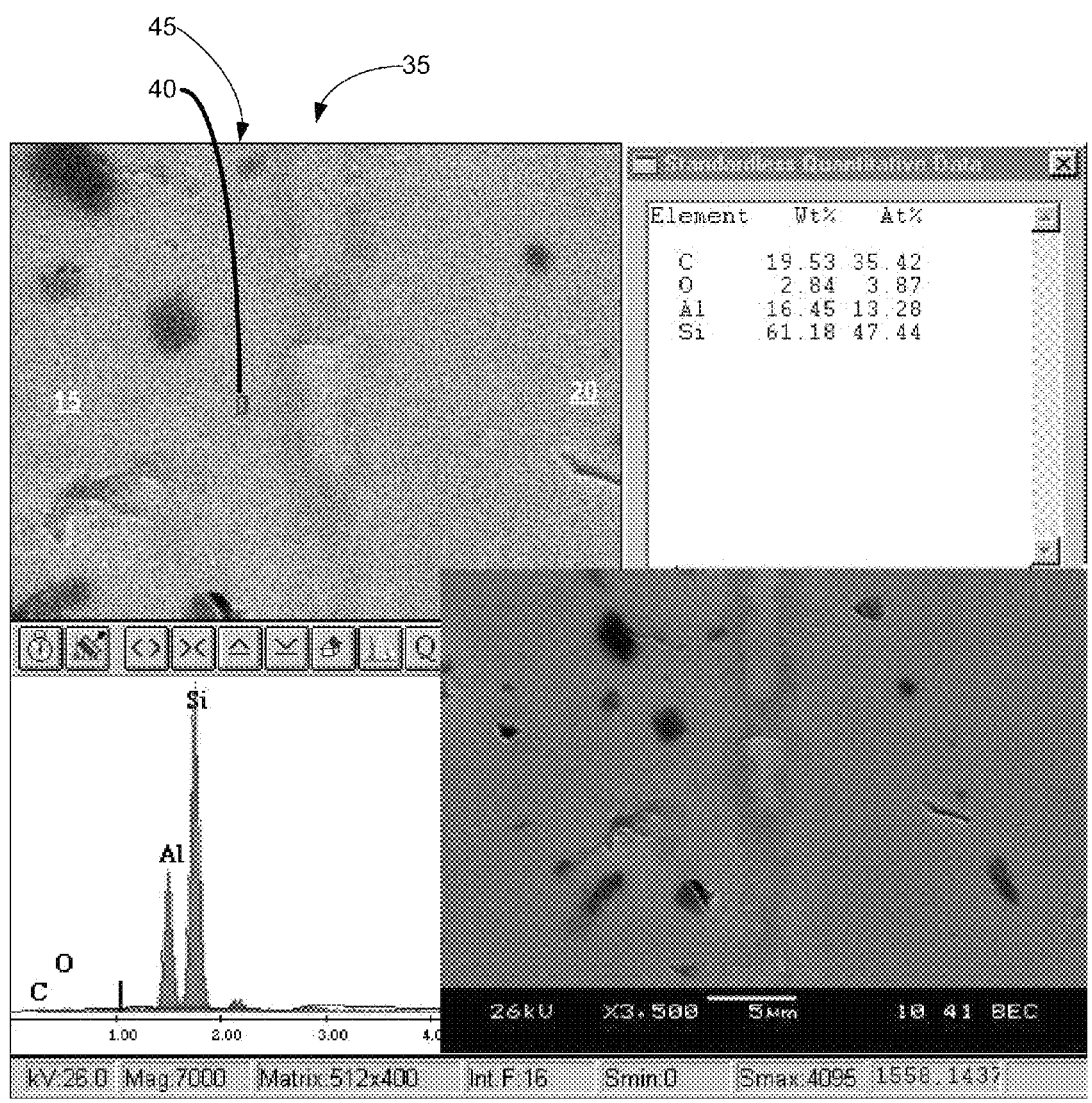
Figure 7:
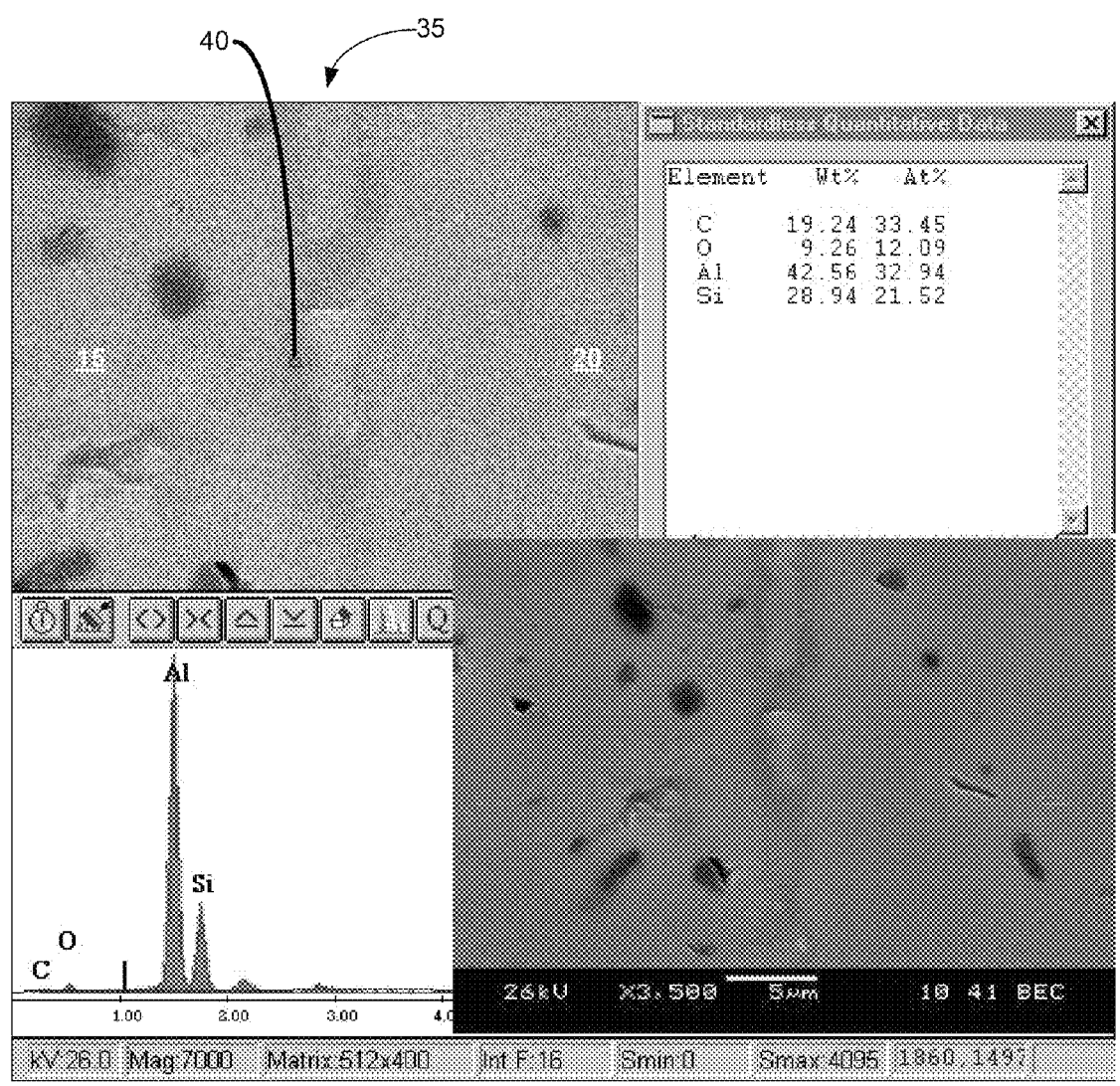
Figure 8:
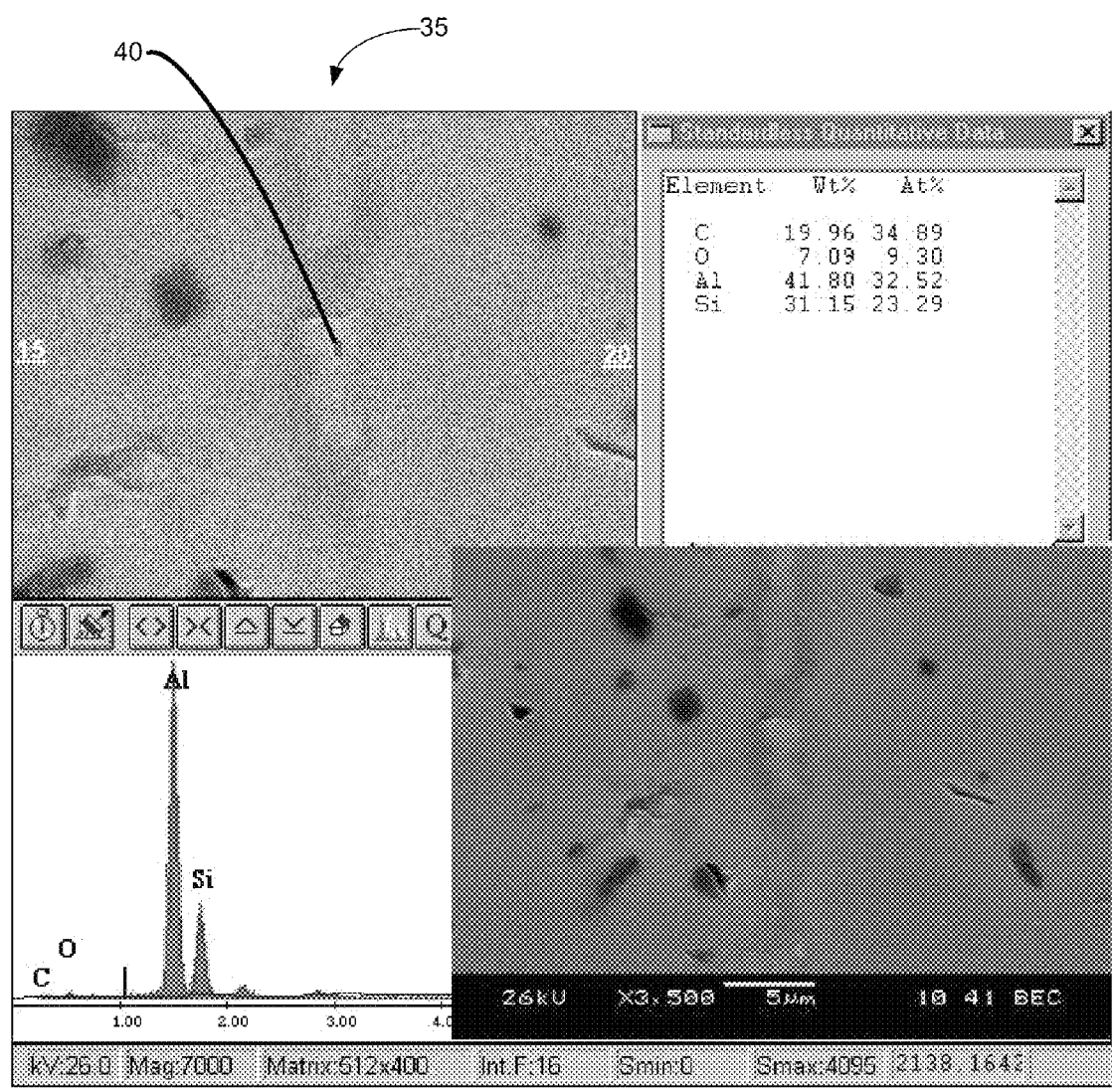
Figure 9:
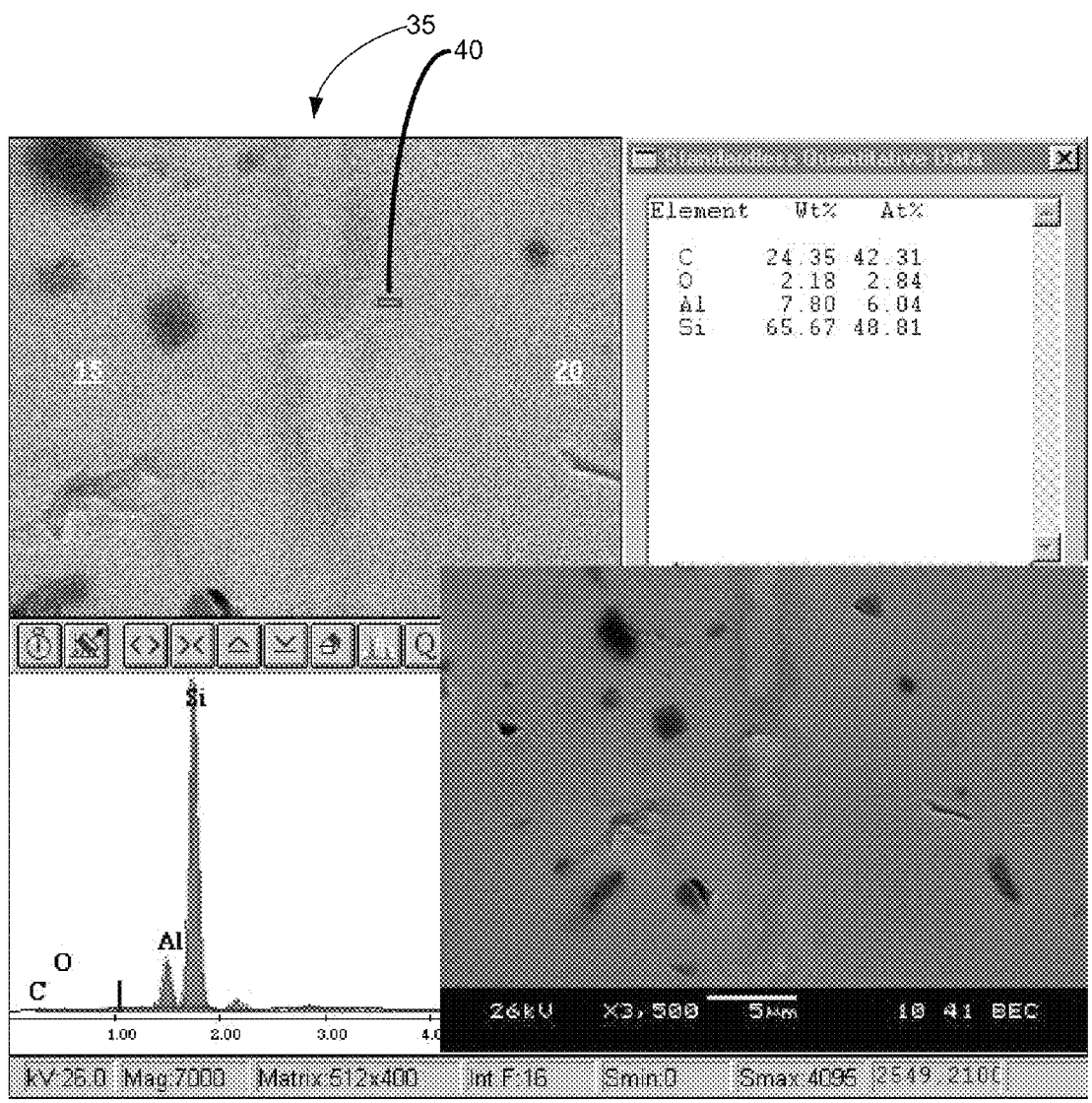

In order to better show the cross-diffusion between chemical species of the joint initiator 10 and the adjacent substrates 15 and 20, FIGS. 6-9 each show measurements taken from different sections (as marked by box 40) of the joint region 35 from FIG. 4, wherein the measurements were made through Energy Dispersive X-Ray Spectroscopy (EDS). In particular, FIG. 6 shows that aluminum (e.g., 16.45 Wt %) from the initiator has diffused into the silicon carbide bulk region 45 of the first substrate 15. Additionally, FIGS. 7 and 8 each shows that inside the joint region 35, where the initiator originally resided, a multi-phase, aluminum silicon oxy carbide material has developed, with areas varying in carbon, silicon, aluminum, and oxygen content. In particular, FIG. 7 shows that while the amount of aluminum in the tested area is about 42.56 Wt %, silicon is present at about 28.94 Wt %, carbon is present at about 19.24 Wt %, and oxygen is also present at about 2.84 Wt %. Additionally, FIG. 8 shows that closer to the center of the joint region 35, aluminum, silicon, carbon, and oxygen are respectively present at about 41.80 Wt %, about 31.15 Wt %, about 19.96 Wt %, and about 7.09 Wt %. FIG. 9 then shows that aluminum has diffused into the second substrate 20. In particular, FIG. 9 shows that in the measured area 40, aluminum, silicon, carbon, and oxygen are respectively present at about 7.80 Wt %, about 65.67 Wt %, about 24.35 Wt %, and about 2.18 Wt %.

Returning now to FIG. 2, after the heating step 125 and the joint region 35 has been formed through cross-diffusion, step 130 shows the method 100 can continue as the joint region 35 is cooled. In this regard, the joint region can be cooled in any suitable manner, including, without limitation, by being cooled under ambient conditions, being cooled at a controlled rate within an insulated heater, and/or through any other suitable means. In this regard, the rate at which the joint region and/or ceramic substrates are cooled may depend upon a number of factors, including, but not limited to, the type and geometry of the ceramics that have been joined The method 100 for forming the described joint can be modified in any suitable manner, including, without limitation, by rearranging, adding to, removing, and/or modifying one or more portions of the method. Indeed, some non-limiting embodiments of a modified method 200 are shown in FIG. 10.

In one example showing how the described method 100 can be modified, step 112 of FIG. 10 shows that the modified method 200 optionally includes grinding an interface surface of one or more of the ceramic substrates (e.g., substrates 15 and/or 20). While this step may perform many functions, in some embodiments, this step provides surface conformity between the two substrates (e.g., allows the two substrates to substantially fit together with the joint initiator between them before the heating step 125) and/or cleans the ground substrate surfaces. Accordingly, while not necessary, this grinding process may result in the formation of stronger joint regions.

In another example, step 114 of FIG. 10 shows that one or more of the substrate interface surfaces can optionally be cleaned to remove chemicals, debris, oils, and/or other contaminates. As with the other steps of this method 200, this cleaning step can be performed at any suitable time. In some embodiments, however, the cleaning step is performed before or after the grinding step 112. Moreover, this cleaning step can be performed in any suitable manner, including, without limitation, by using ethanol, propanol, acetone, another solvent, compressed air, and/or another suitable cleaner to clean off the desired surface.

In still another example of an additional step, step 135 of FIG. 10 shows the method 200 can involve one or more additional heating steps. Through additional thermal treatments, and/or repeating process steps, the joint region 35 can be exposed to additional heat. Accordingly, additional cross-diffusion can occur and the joint region can become more homogenized so as to move closer to a dynamic equilibrium. Thus, in some embodiments, as the joint region is reheated, additional chemical species from the substrates (which tend to be resistive to oxidation) tend to diffuse into the initiator region and chemical species from the initiator diffuse into the oxidation resistant substrates. Thus, unlike the joints produced through certain conventional brazing techniques (which leave a distinct piece of brazing material in the joint), repeatedly exposing the described joint to high temperatures may actually strengthen the joint, as opposed to expediting the oxidation of remaining brazing material.

Where the joint region 35 is reheated one or more times, the joint region can be reheated in any suitable manner. By way of non-limiting example, the joint region can be reheated through the use of a dedicated heating mechanism (e.g., a torch, kiln, oven, thermally-insulated heater, etc.) and/or through its use in high-temperature environments (e.g., in an engine, reactor, etc.).

Additionally, while a load (e.g., according to step 120) can be applied to the joint region 35 during any reheating step 135, in some embodiments, no load need be applied to the joint region during a reheating step. Indeed, due to the cross-diffusion that occurred during the first heating step, the first 15 and second 20 ceramic substrates can be held together (e.g., via an aluminum-initiated joint) without the need for any additional load to be applied to the joint.

FIGS. 11 and 12 show that, in some embodiments, one or more additional heating treatments can cause additional cross-diffusion and, thereby, can further homogenize the joint region 35. In particular, FIG. 11 shows an initial joint that was joined under a load. In contrast, FIG. 12 shows a similar joint region 35 that that was heated for a second time, in air, at about 1200° C., for about 1,000 hours, but without pressure (i.e., no loading). As can be seen, the joint region 35 in FIG. 12 appears to be significantly more homogeneous than the joint region 35 in FIG. 11. Accordingly, it can be seen that, in some embodiments, additional heating can improve the joint region, even without loading after the original joining procedure.

To further illustrate the additional cross-diffusion that can be associated with one or more subsequent heating steps, FIGS. 13-15 each show the EDS spectra of a measured portion (marked as 40) of the thermally cycled joint region shown in FIG. 12. In particular, FIG. 13 shows a bulk/interface region of the joint and FIGS. 14 and 15 show measurements that were taken near the center of the joint. More particularly, FIGS. 13-15 show that the measured regions respectively had aluminum concentrations of about 2.40 Wt %, about 6.21 Wt %, and about 5.24 Wt %. Note the low aluminum concentration shown in the joint region 35 of FIGS. 14 and 15 (compared to the aluminum measured in the joint regions of FIGS. 7 and 8) as well as the overall silicon carbide chemical nature of the resultant joint.

The described joints and their associated methods for making the joints can be used in any suitable application. In some non-limiting embodiments, the described joints and associated methods can be used with heat exchangers, gas turbines, engines, and other systems that are used in both low and high temperatures.

In other non-limiting embodiments, the described joints and methods can be used to join micro-reactors and various subcomponents. Similarly, the described joints and associated methods can be used in reactors or other environments that are subject to high temperatures or that include environments that are very chemically active and/or corrosive. For example, the described methods could be used in floorings and in similar designs.

In still other embodiments, the described joint and methods can be used for satellite dish applications, wherein many parts have to be assembled together to form a structure. While the work to join ceramic satellite dish components may be relatively labor intensive and require a great deal of work when done with some traditional brazing techniques, the present invention can allow this type of process to be done very quickly, inexpensively, and can allow a person to "mate up" and join relatively complex subcomponents into an assembly.

In yet other embodiments, the described joint and methods can be used to build up assemblies from various components through joining, which might hard or near impossible using monolith ceramics.

In addition to the aforementioned characteristics of the described joint and methods, various embodiments of the described joint and methods can have several other features. In one example, unlike some traditional techniques that seek to retain a brazing material between the joined substrates, some embodiments of the described methods involve using cross-diffusion between the joint initiator and the substrates to eliminate the initiator's initial purity, and to replace the initiator with a new chemical species so as to make a multi-phase joint.

In a second example, the described joint may be able to be used at higher temperatures than joints that are formed through some traditional aluminum brazing techniques. Indeed, some traditional brazing techniques leave a distinct aluminum phase behind, which is highly subject to oxidation and its associated weakening. Furthermore, because aluminum's melting point is around 660° C., joints made through such traditional techniques can fail if they are used above that temperature. In contrast, the cross-diffusion that occurs in the described joint region can allow the described joints to function at higher temperatures, including, without limitation, at a temperature that is higher than a temperature selected from about 670° C., about 900° C., about 1,000° C., and about 1,500° C.

In third example, some embodiments of the described methods allow the joint initiator 10 to sufficiently diffuse such that it takes on some of the characteristics of the parts being joined and so that it leaves behind some of the original characteristics that would have prevented it from operating in high-oxidizing environments. In contrast, some traditional brazes may leave behind that original brazing material, which (as described above) is susceptible to oxidation or oxidizing environments, or which may simply weaken, causing the joint to fail, at very high temperatures.

In a fourth example, the described methods can be much less complex than some traditional brazing and joining techniques. Indeed, while some brazing techniques must be performed in a vacuum and/or non-oxygen environment, some embodiments of the described methods can be completed in air and standard atmospheric pressures—thereby eliminating the need for costly set-ups in vacuum furnace systems. Similarly, unlike many traditional brazing techniques, some embodiments of the current methods do not include chemical treatments of the substrates (e.g., to convert surface free silicon to SiN or SiC) before or as part of the joining process.

In a fifth example, unlike some traditional brazing techniques that require doped or alloy metals to serve as the brazing material, some embodiments of the described methods use a substantially pure sample of aluminum as the joint initiator. Furthermore, some embodiments of the described methods simply use aluminum foil, aluminum powder, aluminum ink, and/or another inexpensive form of aluminum as the joint initiator.

In a sixth example, unlike some traditional brazing techniques that require the ceramic substrates to comprise reaction-bonded silicon carbide (RBSC), some embodiments of the present invention do not use such a substrate. Instead, such embodiments use a direct-sintered ceramic carbide (e.g., silicon carbide) or ceramic nitride. Similarly, while some traditional brazing techniques require the use of RBSC with the utilization of a free silicon infiltrant, some embodiments of the described methods do not involve such an infiltrant.

In a seventh example, while some traditional brazing techniques require that a surface layer (e.g., of silicon) be added to a substrate interface surface before being joined, some embodiments of the describe methods do not involve the addition of a surface layer.

In an eighth example, unlike some traditional brazing techniques that require metallization of a ceramic substrate surface before that substrate can be joined to another substrate, some embodiments of the current invention do not involve metallization of either of the substrates.

In a ninth example, unlike some conventional brazing techniques that seek to avoid oxidation and retain an aluminum structure, some embodiments of the described methods obtain a reaction of aluminum with silicon, carbon and oxygen to form an aluminum silicon oxy-carbide, multi-phase material.

In a tenth example, the described joint can be stronger than joints that are formed through some conventional brazing techniques. Indeed, in some embodiments, the described joint region 35 has a joint strength that is greater than about 50% of the bulk strength of the first 15 and second 20 ceramic substrates. In other embodiments, the joint region has a joint strength that is greater than about 60% of the bulk strength of the adjacent ceramic substrates. In other embodiments, the joint region has a joint strength that is greater than about 70% of the bulk strength of the adjacent ceramic substrates. In still other embodiments, the joint region has a joint strength that is greater than about 80% of the bulk strength of the adjacent ceramic substrates. In still other embodiments, the joint region has a joint strength that is greater than about 90% of the bulk strength of the adjacent ceramic substrates. In yet other embodiments, the joint region has a joint strength that is equal to or greater than the bulk strength of the adjacent ceramic substrates.

The following experimental results are given to illustrate various embodiments within the scope of the present invention. These are given by way of example only, and it is understood that the following results are not comprehensive or exhaustive of the many types of embodiments of the present invention that can be prepared in accordance with the present invention.

FIG. 16 shows a computer-generated graph depicting results that show the strength of some embodiments of ceramic to ceramic joints prepared according to the described methods as well as those prepared through another method (e.g., through the use of a pre-ceramic polymer (labeled as PCS) or a joining compound). With respect to the joints prepared in accordance with the described methods, FIG. 16 shows that while aluminum foil was used as the joint initiator 10 in each joint, each joint was formed with a different combination of temperatures and pressures.

Each of the specimens was then tested through a standard 4-point bend test, according to ASTM C1161. As a result, FIG. 16 shows that all of the specimens that were joined with PCS or joining compound failed at the joint—indicating that their joint was weaker than the bulk strength of the ceramic substrates. In contrast, FIG. 16 shows that more often than not, the specimens that were prepared according to the described methods broke in the substrate, as opposed to the joint. Accordingly, FIG. 16 shows that, more often than not, the described joint regions were equal to or stronger than bulk strength of the adjacent ceramic substrates.

Additionally, FIG. 16 shows that, at least in some embodiments, the joints that were prepared at higher temperatures (e.g., 1,200° C. and 1,450° C.) were stronger than similar joints that were prepared at lower temperatures (e.g., 1,000° C.).

It should also be noted that while the silicon carbide manufacturer, whose silicon carbide was used for this joining, reported that the flexural strength of the ceramic substrates was over 400 MPa (as illustrated by the dashed line), each of the ceramic substrates that was tested failed below that point.

While specific embodiments and examples of the present invention have been illustrated and described, numerous modifications come to mind without significantly departing from the spirit of the invention, and the scope of protection is only limited by the scope of the accompanying claims and not by any of the aforementioned embodiments or examples.

The invention claimed is:

1. A ceramic to ceramic joint comprising:
a first ceramic part, wherein the first ceramic part is a direct-sintered ceramic carbide;
a second ceramic part, wherein the second ceramic part is a direct-sintered ceramic carbide; and
an aluminum-initiated joint region formed from an aluminum joint initiator having a thickness between about 5 μm and about 1270 μm, said joint region joining the first and second ceramic parts, wherein the joint region comprises chemical species from the first and second ceramic parts diffused within the joint region, wherein the first ceramic part comprises a first joint diffusion zone disposed adjacent to the joint region which comprises aluminum initiator species from the joint region diffused within the first joint diffusion zone, and wherein the second ceramic part comprises a second joint diffusion zone disposed adjacent to the joint region which comprises aluminum initiator species from the joint region diffused within the second joint diffusion zone, wherein the amount of aluminum initiator species diffused into the first and second joint diffusion zones is greater than the amount of free aluminum initiator species remaining in the joint region.

2. The ceramic to ceramic joint according to claim 1, wherein the joint region has a joint strength greater than 50% of a bulk strength of the first and second ceramic parts.

3. The ceramic to ceramic joint according to claim 1, wherein the joint region has a joint strength greater than 60% of a bulk strength of the first and second ceramic parts.

4. The ceramic to ceramic joint according to claim 1, wherein the joint region has a joint strength greater than 70% of a bulk strength of the first and second ceramic parts.

5. The ceramic to ceramic joint according to claim 1, wherein the joint region has a joint strength greater than 80% of a bulk strength of the first and second ceramic parts.

6. The ceramic to ceramic joint according to claim 1, wherein the joint region has a joint strength greater than 90% of a bulk strength of the first and second ceramic parts.

7. The ceramic to ceramic joint according to claim 1, wherein the joint region has a joint strength greater than or equal to a bulk strength of the first and second ceramic parts.

8. A ceramic to ceramic joint comprising:
a first ceramic part, wherein the first ceramic part is a direct-sintered ceramic carbide;
a second ceramic part, wherein the second ceramic part is a direct-sintered ceramic carbide; and
an aluminum-initiated joint region formed from an aluminum joint initiator having a thickness between about 5 µm and about 1270 µm said joint region joining the first and second ceramic parts characterized by diffusion and counter-diffusion of chemical species between the joint region and the adjoining first and second ceramic parts, wherein the joint region has a joint strength greater than 50% of a bulk strength of the first and second ceramic parts, wherein the amount of aluminum initiator species diffused into the first and second joint diffusion zones is greater than the amount of free aluminum initiator species remaining in the joint region.

9. The ceramic to ceramic joint according to claim 8, wherein the joint region has a joint strength greater than 60% of the bulk strength of the first and second ceramic parts.

10. The ceramic to ceramic joint according to claim 8, wherein the joint region has a joint strength greater than 70% of the bulk strength of the first and second ceramic parts.

11. The ceramic to ceramic joint according to claim 8, wherein the joint region has a joint strength greater than 80% of the bulk strength of the first and second ceramic parts.

12. The ceramic to ceramic joint according to claim 8, wherein the joint region has a joint strength greater than 90% of the bulk strength of the first and second ceramic parts.

13. The ceramic to ceramic joint according to claim 8, wherein the joint region has a joint strength equal to the bulk strength of the first and second ceramic parts.

14. The ceramic to ceramic joint according to claim 1, wherein there is less than 10 mole % of the aluminum initiator species remaining in the joint region.

15. The ceramic to ceramic joint according to claim 1, wherein there is less than 20 mole % of the aluminum initiator species remaining in the joint region.

16. The ceramic to ceramic joint according to claim 1, wherein there is less than 30 mole % of the aluminum initiator species remaining in the joint region.

17. The ceramic to ceramic joint according to claim 1, wherein there is less than 40 mole % of the aluminum initiator species remaining in the joint region.

18. The ceramic to ceramic joint according to claim 1, wherein the first joint diffusion zone, the second joint diffusion zone, and the joint region comprise multiple ceramic phases formed from the aluminum initiator species and chemical species from the first and second ceramic parts.

19. The ceramic to ceramic joint according to claim 1, wherein the aluminum-initiated joint region is formed from undoped aluminum.

20. The ceramic to ceramic joint according to claim 1, wherein the ceramic to ceramic joint functions at a temperature higher than about 670° C.

21. The ceramic to ceramic joint according to claim 1, wherein, wherein the ceramic to ceramic joint functions at a temperature higher than about 900° C.

22. The ceramic to ceramic joint according to claim 1, wherein, wherein the ceramic to ceramic joint functions at a temperature higher than about 1,000° C.

23. The ceramic to ceramic joint according to claim 1, wherein, wherein the ceramic to ceramic joint functions at a temperature higher than about 1,500° C.

24. The ceramic to ceramic joint according to claim 8, wherein there is less than 10 mole % of the aluminum initiator species remaining in the joint region.

25. The ceramic to ceramic joint according to claim 8, wherein there is less than 20 mole % of the aluminum initiator species remaining in the joint region.

26. The ceramic to ceramic joint according to claim 8, wherein there is less than 30 mole % of the aluminum initiator species remaining in the joint region.

27. The ceramic to ceramic joint according to claim 8, wherein there is less than 40 mole % of the aluminum initiator species remaining in the joint region.

28. The ceramic to ceramic joint according to claim 8, wherein the first joint diffusion zone, the second joint diffusion zone, and the joint region comprise multiple ceramic phases formed from the aluminum initiator species and chemical species from the first and second ceramic parts.

29. The ceramic to ceramic joint according to claim 8, wherein the aluminum-initiated joint region is formed from undoped aluminum.

30. The ceramic to ceramic joint according to claim 8, wherein the ceramic to ceramic joint functions at a temperature higher than about 670° C.

31. The ceramic to ceramic joint according to claim 8, wherein, wherein the ceramic to ceramic joint functions at a temperature higher than about 900° C.

32. The ceramic to ceramic joint according to claim 8, wherein, wherein the ceramic to ceramic joint functions at a temperature higher than about 1,000° C.

33. The ceramic to ceramic joint according to claim 8, wherein, wherein the ceramic to ceramic joint functions at a temperature higher than about 1,500° C.

34. A ceramic to ceramic joint comprising:
a first ceramic part, wherein the first ceramic part is a direct-sintered ceramic carbide;
a second ceramic part, wherein the second ceramic part is a direct-sintered ceramic carbide; and
an aluminum-initiated joint region having a thickness of about 3 µm to about 5 µm joining the first and second ceramic parts, wherein the joint region comprises chemical species from the first and second ceramic parts diffused within the joint region, wherein the first ceramic part comprises a first joint diffusion zone disposed adjacent to the joint region which comprises aluminum initiator species from the joint region diffused within the first joint diffusion zone, and wherein the second ceramic part comprises a second joint diffusion zone disposed adjacent to the joint region which comprises aluminum initiator species from the joint region diffused within the second joint diffusion zone, wherein the amount of aluminum initiator species diffused into the first and second joint diffusion zones is greater than the amount of free aluminum initiator species remaining in the joint region.

* * * * *